(12) United States Patent
Shiraki

(10) Patent No.: US 10,313,182 B2
(45) Date of Patent: Jun. 4, 2019

(54) APPARATUS AND METHOD TO DETECT A FAULT IN A COMMUNICATION PATH BY USING A DETECTION PACKET

(71) Applicant: FUJITSU LIMITED, Kawasaki-shi, Kanagawa (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 145 days.

(21) Appl. No.: 15/385,134

(22) Filed: Dec. 20, 2016

(65) Prior Publication Data
US 2017/0187569 A1    Jun. 29, 2017

(30) Foreign Application Priority Data

Dec. 25, 2015 (JP) .................. 2015-254601

(51) Int. Cl.
H04L 12/24      (2006.01)
H04L 12/721     (2013.01)

(52) U.S. Cl.
CPC ...... *H04L 41/0677* (2013.01); *H04L 41/0668* (2013.01); *H04L 41/12* (2013.01); *H04L 45/26* (2013.01)

(58) Field of Classification Search
None
See application file for complete search history.

(56) References Cited

U.S. PATENT DOCUMENTS

| 2014/0211636 A1* | 7/2014 | Robitaille | H04L 43/0829 370/241.1 |
| 2015/0163144 A1* | 6/2015 | Koponen | H04L 47/125 370/237 |
| 2015/0188669 A1* | 7/2015 | Taniguchi | H04W 40/02 370/221 |
| 2015/0263847 A1* | 9/2015 | Baillargeon | H04L 7/0008 370/216 |

FOREIGN PATENT DOCUMENTS

JP    2006-86889    3/2006

OTHER PUBLICATIONS

Mahalingam et al.,"Virtual eXtensible Local Area Network (VXLAN): A Framework for Overlaying Virtualized Layer 2 Networks over Layer 3 Networks", [online], Aug. 2014, (searched on Nov. 11, 2015), Internet <https://tools.ietf.org/html/rfc7348>, for example), pp. 1-22.

\* cited by examiner

*Primary Examiner* — Huy D Vu
*Assistant Examiner* — Bao G Nguyen
(74) *Attorney, Agent, or Firm* — Staas & Halsey LLP

(57) ABSTRACT

An apparatus calculates, from information included in a packet, a first value that is used to select a path through which the packet is to be transmitted to a destination apparatus. When the packet is a detection packet used to detect a fault in a communication path to the destination apparatus, the apparatus obtains a second value by performing calculation on the first value and a variable value that is changed each time the detection packet is transmitted, and (Continued)

adds an outer header including the second value to the packet. The apparatus adds an outer header including the first value to the packet when the packet is not a detection packet. The apparatus transmit the packet to which the outer header has been added, to the destination apparatus.

13 Claims, 24 Drawing Sheets

FIG. 5

| No. | MATCHING INFORMATION ||||||||||
|---|---|---|---|---|---|---|---|---|---|
| | Ethernet header |||| IP header ||| ICMP header ||
| | DA | SA | VLAN ID | Ether Type | Protocol | Source IP addr. | Dest. IP addr. | Type | Code |
| 1 | * | * | * | 0x0800 (IPv4) | 1 (ICMP) | * | * | 8 (echo message) | * |
| 2 | | | | | | | | | |
| : | | | | | | | | | |

FIG. 10

| No. | MATCHING INFORMATION | | | | | | | | | PREDICTED NUMBER OF RECEPTIONS |
|---|---|---|---|---|---|---|---|---|---|---|
| | Ethernet header | | | | IP header | | | ICMP header | | |
| | DA | SA | VLAN ID | Ether Type | Protocol | Source IP addr. | Dest. IP addr. | Type | Code | |
| 1 | MA1 | MA2 | VID1 | 0x0800 (IPv4) | 1 (ICMP) | IP1 | IP2 | 8 (echo message) | 0 | 20 |
| 2 | MA3 | MA4 | VID2 | 0x0800 | 1 | IP3 | IP4 | 8 | 0 | 2 |
| : | : | : | : | : | : | : | : | : | : | : |
| : | : | : | : | : | : | : | : | : | : | : |

FIG. 14

| NUMBER OF REPRODUCTIONS | PROBABILITY |
|---|---|
| 4 | 9 % |
| 10 | 78 % |
| 15 | 95 % |
| 20 | 99 % |

FIG. 20

| VIRTUAL MACHINE | NODE ID | ADDRESS |
|---|---|---|
| VMa | N1 | IPa |
| VMb | N6 | IPb |
| VMc | N1 | IPc |
| VMd | N6 | IPd |

FIG. 21

| No. | Matching Information ||||||||| SP IN OUTER HEADER |
|---|---|---|---|---|---|---|---|---|---|---|
| | Ethernet header |||| IP header ||| ICMP header || |
| | DA | SA | VLAN ID | Ether Type | Protocol | Source IP addr. | Dest. IP addr. | Type | Code | |
| 1 | MA1 | MA2 | VID1 | 0x0800 (IPv4) | 1 (ICMP) | IPa | IPb | 8 (echo message) | 0 | A |
| 2 | MA1 | MA2 | VID1 | 0x0800 (IPv4) | 1 (ICMP) | IPa | IPb | 8 (echo message) | 0 | B |
| : | : | : | : | : | : | : | : | : | : | : |
| : | : | : | : | : | : | : | : | : | : | : |

FIG. 24

| | | NODE | | | | | |
|---|---|---|---|---|---|---|---|
| | | N1 | N2 | N3 | N4 | N5 | N6 |
| CHANGES WITH TIME | t1 | | | | | | |
| | t2 | SP = A | SP = A | SP = A | SP = A | | SP = A |
| | t3 | SP = A | SP = A | SP = A | SP = A | | SP = A |
| | | SP = B | SP = B | SP = B | | SP = B | SP = B |

APPARATUS AND METHOD TO DETECT A FAULT IN A COMMUNICATION PATH BY USING A DETECTION PACKET

CROSS-REFERENCE TO RELATED APPLICATION

This application is based upon and claims the benefit of priority of the prior Japanese Patent Application No. 2015-254601, filed on Dec. 25, 2015, the entire contents of which are incorporated herein by reference.

FIELD

The embodiments discussed herein are related to apparatus and method to detect a fault in a communication path by using a detection packet.

BACKGROUND

Virtual Extensible Local Area Network (VXLAN) may be used as a technology to dispose a virtual network on a physical network by encapsulating packets (see M. Mahalingam et al. "Virtual eXtensible Local Area Network (VXLAN): A Framework for Overlaying Virtualized Layer 2 Networks over Layer 3 Networks", [online], August 2014, (searched on Nov. 11, 2015), Internet <https://tools.ietf.org/html/rfc7348>, for example).

FIG. 1 illustrates an example of communication in which encapsulation is used. Case C1 in FIG. 1 illustrates an example in which communication is made between a node 2a and a node 2b through Tunnel End Points (TEPs) 5. A TEP 5a is disposed in an apparatus in which the node 2a is operating or in the vicinity of the apparatus. A TEP 5b is disposed in an apparatus in which the node 2b is operating or in the vicinity of the apparatus. A network 15 is located between the TEP 5a and the TEP 5b. In this state, the node 2a transmits a packet P1 toward the node 2b. The destination address of the packet P1 is the address of the node 2b, and the source address of the packet P1 is the address of the node 2a. The packet P1 is forwarded from the node 2a to the TEP 5a.

The TEP 5a prestores information on the forwarding of a packet destined for the node 2b to the TEP 5b. Upon receiving a packet P1, the TEP 5a converts the packet P1 into a packet P2 by adding an outer header, which is used for packet forwarding to the TEP 5b, to the packet P1. In the example in FIG. 1, a destination address in the outer header is the address of the TEP 5b, and a source address in the outer header is the address of the TEP 5a. The packet P2 is forwarded through the network 15 as a packet destined for the TEP 5b.

Upon receiving the packet P2, the TEP 5b converts the packet P2 into the packet P1 by removing the outer header thereof. Since the TEP 5b forwards the packet P1 to the node 2b, the packet transmitted from the node 2a arrives at the node 2b.

To provide a redundant path or assure a communication speed, a plurality of paths may be used in communication between apparatuses. Although, in case C1, paths are not illustrated in the network 15, a plurality of paths may also be used to duplicate a path used in communication involving encapsulation. Case 2C illustrates an example in which a path used in communication involving encapsulation is duplicated. In case C2, the TEP 5a is disposed in a server 25a and the TEP 5b is included in a server 25b. The server 25a includes a virtual machine that operates as the node 2a, and the server 25b includes a virtual machine that operates as the node 2b. As illustrated in case C2, a path R1 passing through a switch 20a, a switch 20c, and a switch 20d, and a path R2 passing through the switch 20a, a switch 20b, and the switch 20d are used as communication paths between the server 25a and the server 25b. In this case, values set in the outer header in an encapsulated packet are used to determine which of the path R1 and path R2 is to be used as a path from the TEP 5a to the TEP 5b. For example, media access control (MAC) addresses, a virtual local area network (VLAN) ID, Internet protocol (IP) addresses, port numbers, and the like in the outer header are used to determine a path. The method of setting these items will be described below with reference to FIG. 2.

FIG. 2 illustrates an example of an encapsulated packet. In the description below, a header in a packet to which an outer header has yet to be added, like the packet P1 illustrated in FIG. 1, will be referred to as an inner header. That is, a packet that has yet to be encapsulated has an inner header and a payload. FIG. 2 is an example of a packet that has been encapsulated in a system in which VXLAN is used. In the packet in FIG. 2, an Ether header, an IP header, a User Datagram Protocol (UDP) header, and a VXLAN are included in an outer header. The Ether header includes a destination MAC address (DA), a source MAC address (SA), and a VLAN ID. The IP header includes a destination IP address (DstIP), a source IP address (SrcIP), and protocol information. Protocol information is the type of a transport layer protocol. In the example in FIG. 2, a value indicating UDP is set as protocol information. The UDP header includes a destination port number (DstPort), and a source port number (SrcPort). FIG. 2 just illustrates an example; Transmission Control Protocol (TCP) may be used as the transport layer protocol.

Since the TEP 5a transmits a packet to the TEP 5b to transmit the packet to the last destination specified in the inner header, the destination address in the Ether header and IP header is set at the address assigned to the TEP 5b. The destination port is set at a port number used, in the TEP 5b, in the processing of a packet destined for the node 2b. The source port number is set at a hash value calculated from information of the inner header.

When a path is to be determined by using switches 20, the source port number set in the outer header is used. Therefore, when the source port number is changed depending on the inner header of the packet as illustrated in FIG. 2, a load applied when there are a plurality of packet forwarding paths is distributed.

As a related technology, an edge router is proposed that registers flow information about packets forwarded from a user network to a provider network, and monitors the communication state of each flow registered, with reference to information about packets forwarded from the provider network to the user network (see Japanese Laid-open Patent Publication No. 2006-86889, for example).

SUMMARY

According to an aspect of the invention, an apparatus calculates, from information included in a packet, a first value that is used to select a path through which the packet is to be transmitted to a destination apparatus. When the packet is a detection packet used to detect a fault in a communication path to the destination apparatus, the apparatus obtains a second value by performing calculation on the first value and a variable value that is changed each time the detection packet is transmitted. The apparatus adds an outer header including the second value to the packet when the packet is a detection packet, adds an outer header including the first value to the packet when the packet is not a detection packet, and transmits the packet to which the outer header has been added, to the destination apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of matching information, according to an embodiment;

FIG. 10 is a diagram illustrating an example of information stored in a memory, according to an embodiment;

FIG. 14 is a diagram illustrating an example of correspondence between the number of reproductions and coverage, according to an embodiment;

FIG. 20 is a diagram illustrating an example of address information, according to an embodiment;

FIG. 21 is a diagram illustrating an example of information stored in a header information recording unit, according to an embodiment;

FIG. 24 is a diagram illustrating an example of information stored in a recording unit, according to an embodiment.

DESCRIPTION OF EMBODIMENTS

A detection packet may be transmitted to detect a fault in a path from a communication apparatus to an apparatus with which the communication apparatus communicates. However, different port numbers are used in the detection packet and a data packet. Therefore, if a communication path in which encapsulation is performed is duplicated, different paths may be used in the forwarding of the detection packet and in the forwarding of the data packet. In this case, even if a detection packet is used, it is difficult to correctly determine whether there is a fault in the path used for data packet communication. Although a system that uses VXLAN has been described in BACKGROUND as an example, even if VXLAN is not used, a communication system involving encapsulation has a similar problem. Even if the technology that has been described as a related technology is used, a similar problem occurs.

It is preferable to easily detect a fault in a communication path.

Figure 3:
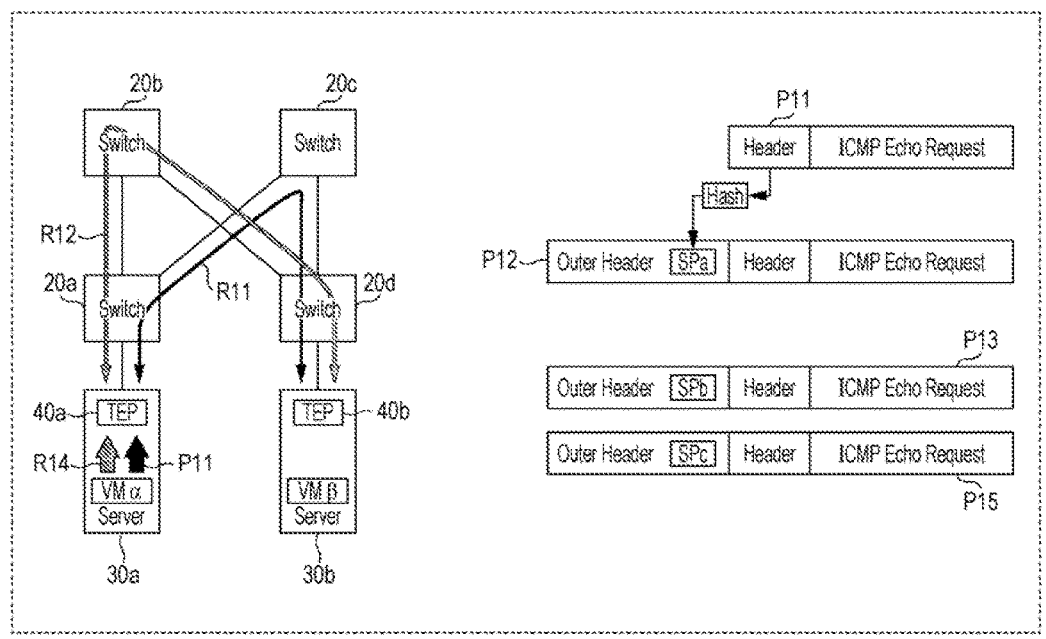
FIG. 3 is a diagram illustrating an example of a communication method, according to an embodiment.

FIG. 3 illustrates an example of a communication method in an embodiment. In the example in FIG. 3, a path R11 and a path R12 are used as communication paths from a virtual machine α (VMα) in a communication apparatus 30a to a virtual machine β (VMβ) in a communication apparatus 30b. The path R11 passes through a switch 20a, a switch 20c, and a switch 20d. The path R12 passes through the switch 20a, a switch 20b, and the switch 20d. The communication apparatus 30a includes a TEP 40a, and the communication apparatus 30b includes a TEP 40b.

The virtual machine α in the communication apparatus 30a creates a detection packet P11 used to detect a fault in a path between the virtual machine α and the virtual machine β. In the example in FIG. 3, an Echo message in Internet Control Message Protocol (ICMP) is used as the detection packet. That is, the detection packet P11 created in the virtual machine α is an ICMP Echo Request message. The detection packet P11 created in the virtual machine α is output to the TEP 40a. The TEP 40a sets a hash value of the inner header in the detection packet P11 to a source port number in the outer header. The resulting packet is called a packet P12. In the example in FIG. 3, SPa is the value of the source port number of the packet P12.

Next, the TEP 40a determines whether the detection packet P11, which has been encapsulated, is a detection packet used to detect a fault. The TEP 40a prestores a condition for a detection packet. The TEP 40a references the prestored information and determines that the detection packet P11 is a detection packet. The TEP 40a then performs a calculation on the hash value (SPa) of the inner header and a variable that takes a value changed each time a detection packet is transmitted. It will be assumed here that the value of the variable used in the calculation is X and a value SPb is obtained in the calculation. The TEP 40a changes the source port number, which has been used for encapsulation, in the outer header from SPa to SPb. The resulting packet is called a packet P13. The TEP 40a transmits the created packet P13 toward the TEP 40b. Along with the transmission of the detection packet, the TEP 40a changes the value of the variable. It will be assumed here that the value of the variable is changed from X to Y.

When the packet P13 arrives at the switch 20a, information in the outer header in the packet P13 is used for path selection. It is assumed here that the packet P13 is transmitted through the path R11.

Next, the virtual machine α creates a detection packet P14. The detection packet P14 has the same information as the detection packet P11. The virtual machine α outputs the detection packet P14 to the TEP 40a. Then, the TEP 40a uses the inner header in the detection packet P14 to create an outer header. Since the detection packet P14 and detection packet P11 are ICMP Echo Request messages in the same segment, when the outer header is added to the detection packet P14, the packet P12 is obtained. Therefore, the source port number in the outer header is set at SPa.

Next, when the TEP 40a determines that the detection packet P14, which has been encapsulated, is a detection packet to be used in fault detection, the TEP 40a performs a calculation on the variable and the hash value (SPa) of the inner header. It is assumed here that the value of the variable used in the calculation is set at Y and a value SPc is obtained in the calculation on SPa and Y. The TEP 40a changes the source port number, which has been used for encapsulation, in the outer header from SPa to SPc. The resulting packet is called a packet P15. The TEP 40a transmits the created detection packet P15 toward the TEP 40b. Along with the transmission of the detection packet, the TEP 40a changes the value of the variable.

When the packet P15 arrives at the switch 20a, information in the outer header in the packet P15 is used for path selection. Since the packet P15 has a different source port number from the packet P13, the packet P15 is forwarded to the destination through a different path from the packet P13. It is assumed here that the packet P15 is transmitted through the path R12.

When the packet P13 arrives at the communication apparatus 30b, the TEP 40b removes the outer header from the packet P13 and outputs the resulting packet to the virtual machine β. Since the packet output to the virtual machine β has been restored to the original state of the detection packet P11, the virtual machine β transmits a reply packet to the virtual machine α in the communication apparatus 30a. In the case as well in which the packet P15 arrives at the communication apparatus 30b, the same processing is executed, in which case a reply packet to the packet P15 is also transmitted toward the virtual machine α. An outer header is added to the reply packet as well by the TEP 40b and the resulting packet is forwarded toward the communication apparatus 30a.

Upon receiving the reply packet, the TEP 40a removes the outer header and outputs the resulting packet to the virtual machine α. Since the virtual machine α receives two reply packets in response to the transmission of two detection packets (P11 and P14), the virtual machine α determines that there is no fault occurring on the communication paths between the virtual machine α and the virtual machine β.

For easy understanding, an example has been described in which, after an outer header that uses a source port number calculated from information of a detection packet has been added to the detection packet, the source port number is changed. However, the outer header may be added at any time. For example, as descried later, after a calculation on a variable and a candidate value of the source port number calculated from the detection packet, an outer header may be created and may be added to the detection packet.

As described above, when transmitting a detection packet, a variable that takes a different value for each packet is used to change the source port number included in the outer header in the detection packet. Therefore, even if a communication path has been duplicated, each detection packet may be transmitted through a different path, making faults in the communication paths easy to detect.

First Embodiment

Figure 4:
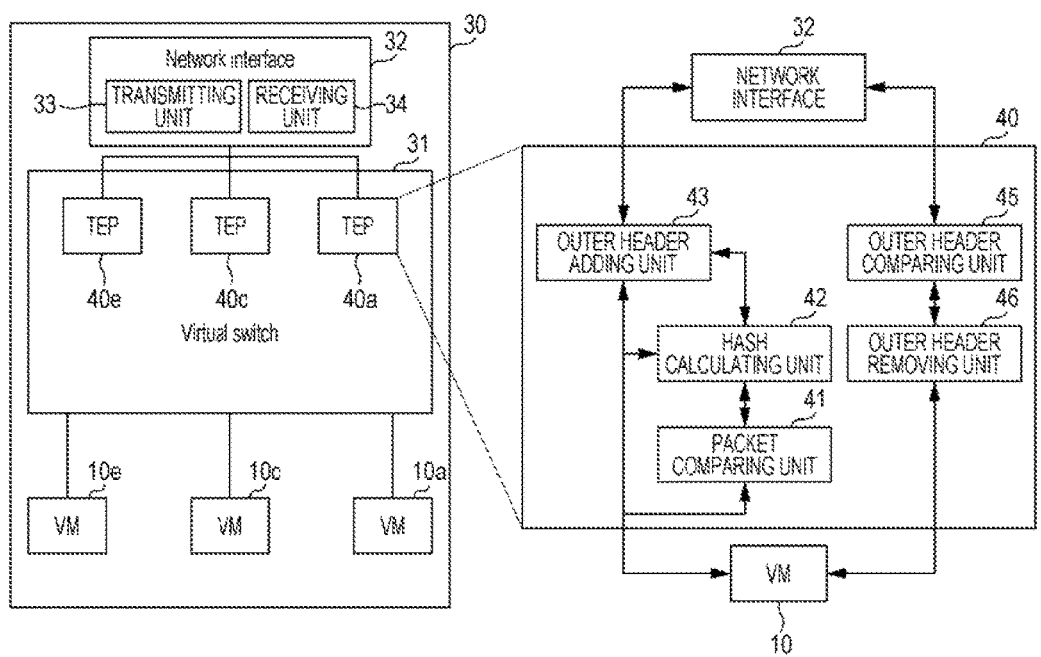
FIG. 4 is a diagram illustrating an example of a configuration of a communication apparatus, according to an embodiment.

FIG. 4 illustrates an example of the structure of a communication apparatus 30. The communication apparatus 30 includes virtual machines 10 (10a, 10c, and 10e), a virtual switch 31, and a network interface 32. The virtual switch 31 includes TEPs 40 (40a, 40c, and 40e). The network interface 32 includes a transmitting unit 33 and a receiving unit 34. The transmitting unit 33 transmits a packet to another apparatus on a network. The receiving unit 34 receives a packet from another apparatus on the network. The communication apparatus 30 is implemented as an arbitrary information processing apparatus including a server and the like. FIG. 4 just illustrates an example of the communication apparatus 30. The number of virtual machines 10 operating in the communication apparatus 30 may be changed to any value. The number of TEPs 40, each of which is implemented by the virtual switch 31, may also be changed to any value according to the implementation.

Each virtual machine 10 communicates via one of the TEPs 40 in the virtual switch 31. In the description below, it is assumed that the virtual machine 10a communicates via the TEP 40a. Similarly, it is assumed that the virtual machine 10c communicates via the TEP 40c and the virtual machine 10e communicates via the TEP 40e.

Each TEP 40 includes a packet comparing unit 41, a hash calculating unit 42, an outer header adding unit 43, an outer header comparing unit 45, and an outer header removing unit 46. The packet comparing unit 41 prestores a detection condition to identify a detection packet. When the packet comparing unit 41 receives a packet from the virtual machine 10, the packet comparing unit 41 determines whether the received packet is a detection packet. An example of information used to determine whether the received packet is a detection packet will be described below with reference to FIG. 5. When the packet comparing unit 41 receives a detection packet, the packet comparing unit 41 notifies the hash calculating unit 42 that a detection packet has been received. When the hash calculating unit 42 is notified that a detection packet has been received, the hash calculating unit 42 performs a calculation on the hash value in the inner header in the packet received from the virtual machine 10 and a variable which is set at a different value for each detection packet. The hash calculating unit 42 outputs a value obtained in the calculation to the outer header adding unit 43. The outer header adding unit 43 adds an outer header to the packet received from the virtual machine 10. The outer header adding unit 43 creates an outer header by using the inner header in a packet to be encapsulated and a value received from the hash calculating unit 42. The value received from the hash calculating unit 42 is used as a source port number in the outer header.

An outer header comparing unit 45 determines whether the destination IP address in the outer header in the packet received through the receiving unit 34 is the IP address assigned to the TEP 40 that includes the outer header comparing unit 45. When the packet destined for the IP address assigned to the TEP 40 is received, the outer header comparing unit 45 outputs the received packet to the outer header removing unit 46. The outer header removing unit 46 removes the outer header from the received packet and outputs the resulting packet to the virtual machine 10.

FIG. 5 illustrates an example of matching information. Matching information, which is used by the packet comparing unit 41 to detect a detection packet, is prestored in the packet comparing unit 41 or is read from a memory 102 (see FIG. 8) by the packet comparing unit 41 at an appropriate point in time. The matching information illustrated in the example in FIG. 5 includes information of an Ethernet header, an IP header, and an ICMP header. The values of a destination MAC address (DA), a source MAC address (SA), a VLAN ID, and an Ether type in the Ethernet header are used to specify matching information. The values of a protocol type, a source IP address, and a destination IP address, which are information in the IP header, are also used to specify matching information. In the ICMP header, the values of a type and a code are used to specify matching information. Each asterisk (*) in the matching information indicates a wildcard. Any value set in a cell in which an asterisk is indicated is determined to match the matching information.

In the example in FIG. 5, a packet in which the Ether type is 0x0800, the protocol type in the IP header is 1, the type in the ICMP header is 8 is detected as a detection packet, regardless of the transmission source and transmission destination of the packet. The Ether type set at 0x0800 indicates that IPv4 is used. The protocol type, in the IP header, set at 1 indicates that ICMP is used. The type, in the ICMP header, set at 8 indicates an Echo Request message. Therefore, the packet comparing unit 41 using the matching information in FIG. 5 detects an Echo Request message transmitted and received among arbitrary apparatuses as a detection packet.

Figure 6:
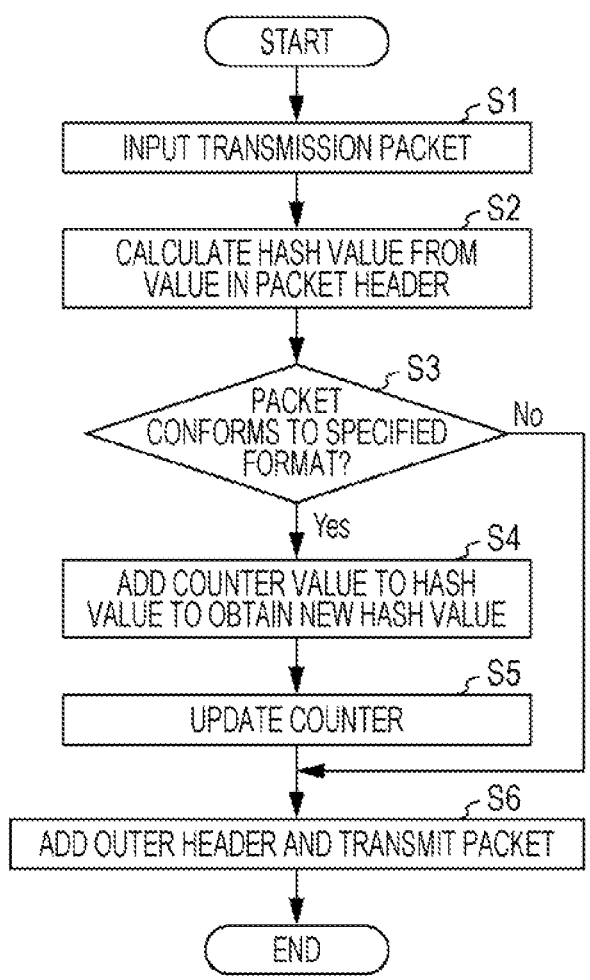
FIG. 6 is a diagram illustrating an example of an operational flowchart for processing performed by a communication apparatus, according to an embodiment.

FIG. 6 is a flowchart illustrating an example of processing executed by the communication apparatus 30. An example of detection packet transmission processing executed in the communication apparatus 30 will be described below. In the description below, a case will be taken as an example in which a detection packet, which is created by the virtual machine 10*a* to detect whether there is a fault in a communication path to a virtual machine 10*b* (not illustrated) as a communication destination, is transmitted through the TEP 40*a*. In the description with reference to FIG. 6, it will be assumed that the hash calculating unit 42 internally includes a counter used to create a variable that takes a different value for each detection packet. Processing in FIG. 6 is just an example. For example, step S2 and step S3 may be concurrently executed, and step S4 and step S5 may be concurrently executed.

It will be assumed that the virtual machine 10*a* creates an ICMP Echo Request message destined for the virtual machine 10*b*. The virtual machine 10*a* outputs the created packet to the TEP 40*a*. In the TEP 40*a*, the packet created in the virtual machine 10*a* is input to the packet comparing unit 41, hash calculating unit 42, and outer header adding unit 43 (step S1).

The hash calculating unit 42 receives the packet and calculates a hash value from the value in a header in the received packet (step S2). The header used to calculate the hash value in step S2 is a header in the packet received from the virtual machine 10*a*, so the header is equivalent to the inner header.

The packet comparing unit 41 also receives the packet from the virtual machine 10*a* and compares information in the headers in the received packet with the matching information to determine whether the packet conforms to the format specified in the matching information (step S3).

When the packet conforms to the format specified in the matching information, the packet comparing unit 41 determines that the received packet is a detection packet (the result in step S3 is Yes). The packet comparing unit 41 then notifies the hash calculating unit 42 that a detection packet has been detected. Upon receiving the notification from the packet comparing unit 41, the hash calculating unit 42 acquires a counter value from the counter which creates a variable that takes a different value for each detection packet. The hash calculating unit 42 adds the counter value to the hash value calculated in step S2 and takes the resulting value as a new hash value (step S4). The hash calculating unit 42 outputs the new hash value to the outer header adding unit 43. After that, the hash calculating unit 42 updates the counter value (step S5).

The outer header adding unit 43 sets the value received from the hash calculating unit 42, to the source port number of the outer header in the packet received from the virtual machine 10*a*. Of the information in the outer header, information other than the source port number is created according to the packet input from the virtual machine 10*a* to the outer header adding unit 43. The outer header adding unit 43 adds the created outer header to the packet and transmits the resulting packet with the outer header added, via the transmitting unit 33 (step S6).

On the other hand, when the packet does not conform to the format specified in the matching information, the packet comparing unit 41 determines that the received packet is not a detection packet. The hash calculating unit 42 then outputs the hash value calculated in step S2 to the outer header adding unit 43, based on the determination result made in the packet comparing unit 41 (the result in step S3 is No). After that, processing in step S6 is executed. In this processing, the outer header adding unit 43 creates an outer header in which the value received from the hash calculating unit 42 is set as the source port number. Therefore, a source port number in an outer header added to a packet that is not a detection packet is the value calculated from a header in the packet input from the virtual machine 10*a* to the TEP 40*a*.

Figure 1:
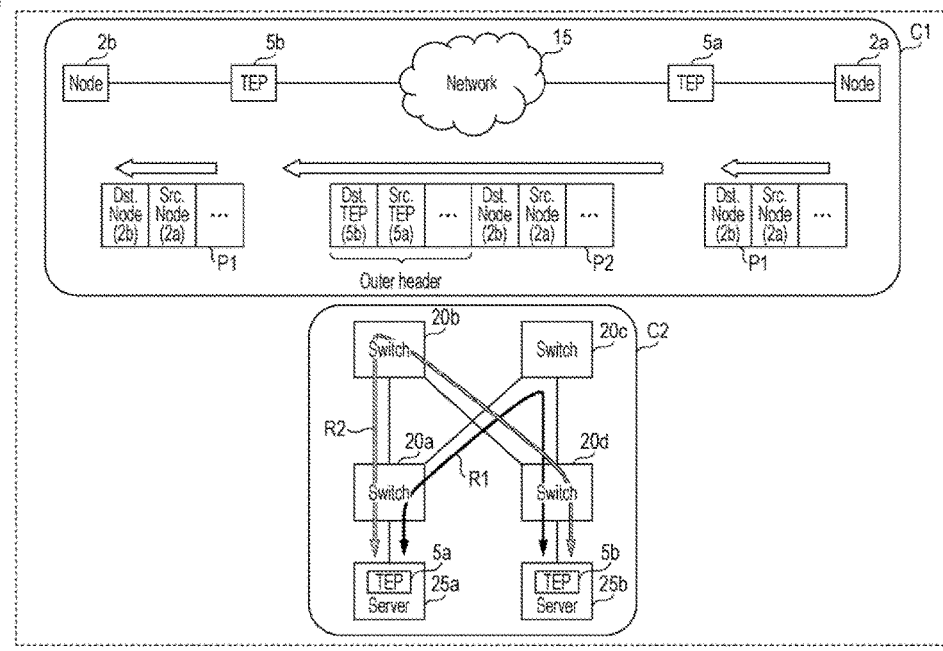
FIG. 1 is a diagram illustrating an example of communication in which encapsulation is used, according to an embodiment.
Figure 2:
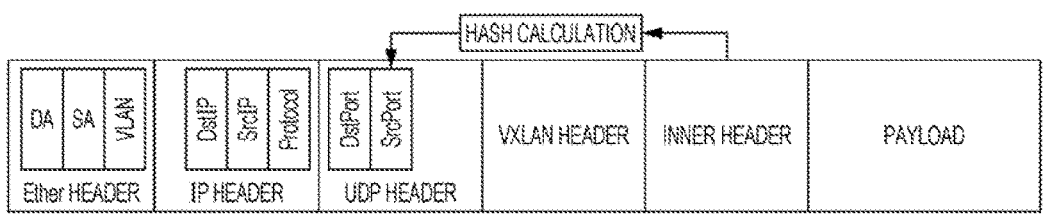
FIG. 2 is a diagram illustrating an example of an encapsulated packet, according to an embodiment.
Figure 7:
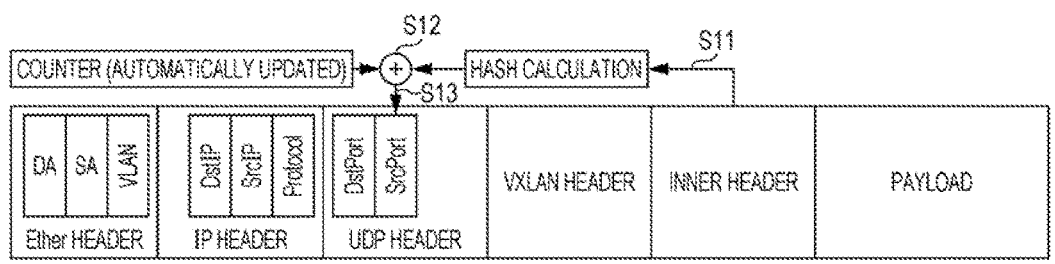
FIG. 7 is a diagram illustrating an example of an encapsulated packet, according to an embodiment.

FIG. 7 illustrates an example of an encapsulated packet. In FIG. 7, processing in the hash calculating unit 42 and outer header adding unit 43 is illustrated. The packet in FIG. 7 includes an Ether header, an IP header, a UDP header, a VXLAN header, an inner header, and a payload. The Ether header, IP header, UDP header, and VXLAN header are included in an outer header. The type of the information element included in each header is as described with reference FIG. 2.

Step S11 illustrates a way in which the hash calculating unit 42 creates a hash value in the inner header, and corresponds to processing in step S2 in FIG. 6. When the packet under processing is determined to be a detection packet as described with reference to step S3 in FIG. 6, the outer header adding unit 43 adds the counter value to the result in hash value calculation (step S12). Processing in step S12 corresponds to step S4 in FIG. 6. In the example in FIG. 7, in a counter included in the hash calculating unit 42, automatic addition processing is executed while the hash calculating unit 42 reads the value of the counter. After that, the hash calculating unit 42 outputs the sum of the hash value and counter value to the outer header adding unit 43, and the outer header adding unit 43 sets the sum received from the hash calculating unit 42 to the source port number in the outer header (step S13).

Figure 8:
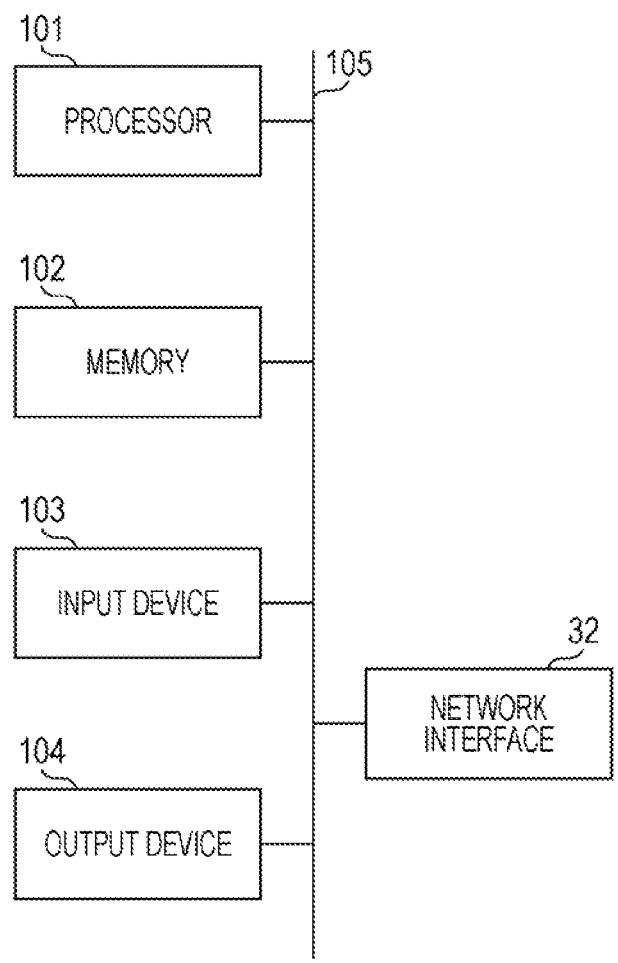
FIG. 8 is a diagram illustrating an example of a hardware configuration, according to an embodiment.

FIG. 8 illustrates an example of the hardware structure of the communication apparatus 30. The communication apparatus 30 includes a processor 101, a memory 102, a bus 105, and the network interface 32. The communication apparatus 30 may further include at least one of an input device 103 and an output device 104. The processor 101 is an arbitrary processing circuit that includes a central processing unit (CPU), and able to execute programs stored in the memory 102. The processor 101 implements the virtual machines 10 and TEPs 40. The memory 102 includes a random access memory (RAM), a read only memory (ROM), and a semiconductor memory such as a flash memory, and stores programs and data used in processing. When used as a storage area in virtual machines 10 or used by TEPs 40 to store data, the memory 102 implements part of the virtual machines 10 or TEPs 40. The bus 105 interconnects the processor 101, memory 102, input device 103, output device 104, and network interface 32 so that they mutually output and input data to and from each other. The network interface 32 operates as the transmitting unit 33 and receiving unit 34. The input device 103 is an arbitrary device used to input information, such as a keyboard and a mouse. The output device 104 is an arbitrary device used to output data, such as a display device including a display.

As described above, in the first embodiment, the source port number included in the outer header in a detection packet is obtained as the sum of the hash value in the inner header and a value of the counter that takes a different value for each detection packet. Therefore, when a communication path to the communication destination is duplicated, transmitting a plurality of detection packets to the communication destination allows an apparatus that transmits detection packets, to increase the possibility that different detection packets are transmitted through different paths. When, for example, the virtual machine 10a transmits two detection packets to investigate the situation of paths between the virtual machine 10a and the virtual machine 10b, a first detection packet and a second detection packet that are transmitted in that order may be distributed to different paths. In this case, even if the virtual machine 10a receives a reply packet to the first detection packet, when the second detection packet does not arrive at the destination due to a fault in the path through which the second detection packet has been transmitted, the virtual machine 10a does not receive a reply packet to the second detection packet. When the virtual machine 10 does not receive a reply message within a predetermined time from the transmission of the detection packet, the virtual machine 10 determines that there is a fault in the path. As a result, in a system in which the apparatus according to the first embodiment is used, faults in communication paths provided in a redundant manner may be easily detected.

Second Embodiment

Figure 9:
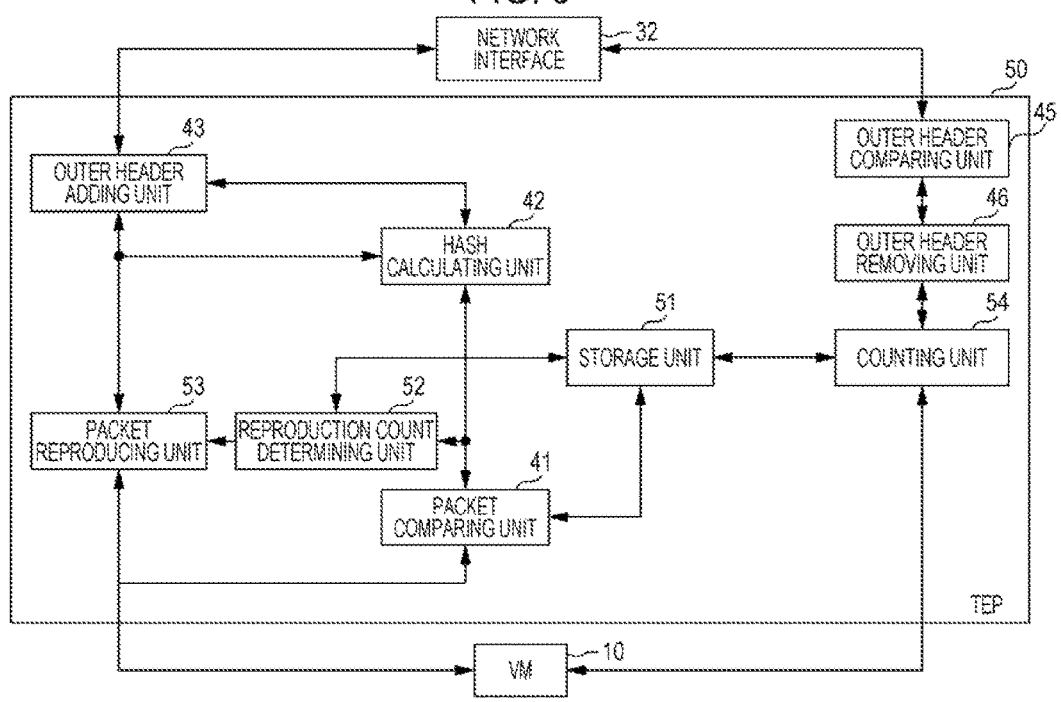
FIG. 9 is a diagram illustrating an example of a configuration of a TEP, according to an embodiment.

FIG. 9 illustrates an example of the structure of a TEP 50 included in the communication apparatus 30 used in a second embodiment. The TEP 50 includes a storage unit 51, a reproduction count determining unit 52, a packet reproducing unit 53, and a counting unit 54. The TEP 50 also includes the packet comparing unit 41, hash calculating unit 42, outer header adding unit 43, outer header comparing unit 45, and outer header removing unit 46. In the second embodiment, a packet output from the virtual machine 10 is input to the packet comparing unit 41 and packet reproducing unit 53. The packet reproducing unit 53 reproduces a detection packet by the number of reproductions determined by the reproduction count determining unit 52. The storage unit 51 stores the headers in the detection packet to be reproduced and also stores the predicted number of reply packet receptions obtained from each of the numbers of reproductions of the detection packets. Information stored in the storage unit 51 will be described later in detail with reference to FIG. 10. Processing executed by the packet comparing unit 41, hash calculating unit 42, outer header adding unit 43, outer header comparing unit 45, and outer header removing unit 46 is the same as in the first embodiment. The counting unit 54 counts the number of reply packets transmitted from the communication destination in response to a detection packet. In this counting, the counting unit 54 uses information stored in the storage unit 51.

Of the units in the TEP 50, the reproduction count determining unit 52, packet reproducing unit 53, counting unit 54, packet comparing unit 41, hash calculating unit 42, outer header adding unit 43, outer header comparing unit 45, and outer header removing unit 46 may be implemented by the processor 101. The storage unit 51 may be implemented by the memory 102.

FIG. 10 illustrates an example of information stored in the storage unit 51. Information items stored in the storage unit 51 are an entry number that uniquely identifies a detection packet, matching information that was used to detect the detection packet identified by the entry number, and a predicted number of receptions, these information items being stored in association with each other. The predicted number of receptions is the number of reply packets that are predicted to be received by the communication apparatus 30 if there is no fault in paths from the transmission source of the detection packet to its destination. Therefore, the predicted number R of receptions is calculated from equation (1).

$$R=N-M \qquad (1)$$

where N is the number of reproductions of a detection packet and M is the number of receptions of reply packets responsive to the detection packet. When a detection packet is to be transmitted, therefore, R is set to N (number of reproductions).

For example, it will be assumed that the packet comparing unit 41 detects, as a detection packet, an ICMP Echo Request message that has been transmitted from a transmission source to which an address of IP1 is assigned, to a communication destination with an address of IP2. When the packet comparing unit 41 inputs information included in the headers in the detection packet, matching information at entry No. 1 is recorded. In this example, it will be assumed that, in the Ethernet header in the detection packet at entry No. 1, DA is set at MA1, SA is set at MA2, VLAN ID is set at VID1, and the Ether type is set at 0x0800. It will be also assumed that the reproduction count determining unit 52 has notified the storage unit 51 that the number of reproductions of a detection packet is 20. Then, since a reply packet to the detection packet at entry No. 1 has not yet been received, 20 is recorded in the storage unit 51 as the predicted number R of receptions at entry No. 1 (R=N−M=20−0=20). The same processing of storing the predicted number R of receptions in the storage unit 51 is executed for other detection packets.

Figure 11:
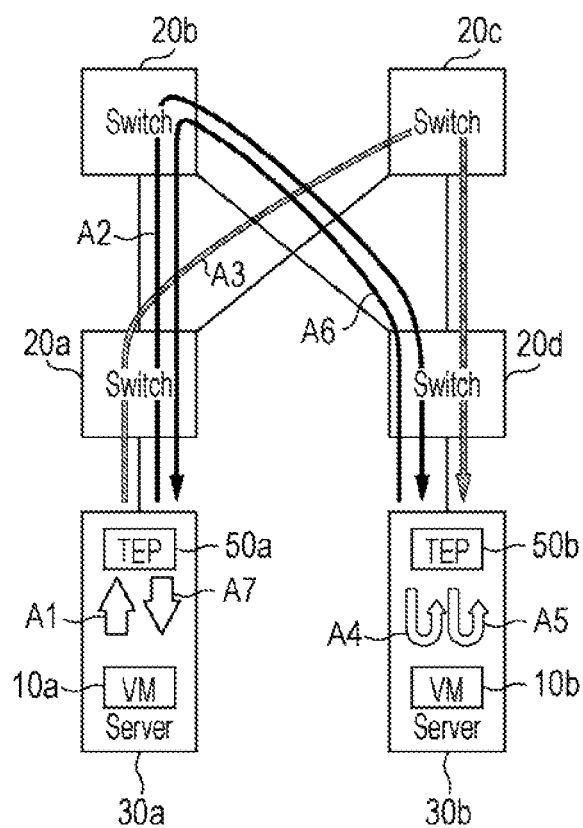
FIG. 11 is a diagram illustrating an example of a communication method, according to an embodiment.

FIG. 11 illustrates an example of a communication method in the second embodiment. An example of processing executed in the second embodiment will be described below by taking, as an example, a case in which the virtual machine 10a operating in the communication apparatus 30a checks whether there is a fault in communication paths between the virtual machine 10a and the virtual machine 10b operating in the communication apparatus 30b. It will be assumed that two communication paths are set between the virtual machine 10a and the virtual machine 10b; one of these communication paths passes through the switch 20a, switch 20b, and switch 20d, and the other one passes through the switch 20a, switch 20c, and switch 20d. It will be also assumed that the packet comparing unit 41 uses the matching information in FIG. 5 in the second embodiment as well. For the easy distinction of units in operation, the reference numeral of each unit in each TEP 50 will sometimes be suffixed with the letter that is used as a suffix of the reference numeral of the TEP 50. For example, a reproduction count determining unit 52a represents the reproduction count determining unit 52 included in a TEP 50a.

First, the virtual machine 10a creates an ICMP Echo Request message destined for the virtual machine 10b. The virtual machine 10a then outputs the created packet to the TEP 50a (arrow A1).

A packet comparing unit 41a compares the packet received from the virtual machine 10a with the matching information (see FIG. 5) and determines whether the packet is a detection packet. Determination processing executed by the packet comparing unit 41a is the same as in the first embodiment. When the packet comparing unit 41a determines that a detection packet has been input, the packet comparing unit 41a notifies a hash calculating unit 42a and a reproduction count determining unit 52a of the determination result. In addition, the packet comparing unit 41a outputs information in the headers in the detection packet to a storage unit 51a. It will be assumed here that information described below is output from the packet comparing unit 41a to the storage unit 51a.

Source MAC address: MA4
Destination MAC address: MA3
VLAN ID: VID2
Ether type: 0x0800
Protocol: ICMP
Source IP address: IP3
Destination IP address: IP4
Type of ICMP header: 8 (Echo Request)
Code: 0

Then, the storage unit 51a stores the matching information of which the storage unit 51a has been notified by the packet comparing unit 41a in association with the relevant entry number. In this example, matching information in the entry at No. 2 in FIG. 10 is recorded in the storage unit 51a.

The reproduction count determining unit 52a determines the number of reproductions of the detection packet of which the reproduction count determining unit 52a has been notified by the packet comparing unit 41a. It will be assumed here that the reproduction count determining unit 52a determines that the number of reproductions of the detection packet is 2. The reproduction count determining unit 52a then outputs the determined number of reproductions to the storage unit 51a in association with the header information in the detection packet. The storage unit 51a records the number of reproductions of which the storage unit 51a has been notified, as the predicted number of receptions associated with the header information of which the storage unit 51a has been notified. As a result, information in the entry at No. 2 in FIG. 10 is stored in the storage unit 51a.

A packet reproducing unit 53a reproduces the packet input from the virtual machine 10a as many times as the number determined by the reproduction count determining unit 52a, and outputs the reproduced packets to the hash calculating unit 42a and an outer header adding unit 43a. In this case, since the detection packet is reproduced twice, a first reproduced detection packet is referred to as the packet P31, and a second reproduced detection packet is referred to as the packet P32. The hash calculating unit 42a and outer header adding unit 43a handle the packet P31 and packet P32 as different packets. Therefore, due to processing executed according to a procedure similar to the procedure described in the first embodiment, the source port number used in the outer header in the packet P31 and the source port number used in the outer header in the packet P32 take mutually different values.

It will be assumed that the outer header adding unit 43a transmits a packet obtained by adding an outer header to the packet P31 through a transmitting unit 33a. The packet P31 with the outer header added is transmitted through the path passing through the switch 20a, switch 20b, and switch 20d as indicated by the arrow A2 in FIG. 11, and arrives at the communication apparatus 30b.

On the other hand, a packet obtained by adding an outer header to the packet P32 is also transmitted through the transmitting unit 33a. The packet P32 with the outer header added is transmitted through the path passing through the switch 20a, switch 20c, and switch 20d as indicated by the arrow A3 in FIG. 11, and arrives at the communication apparatus 30b.

An outer header comparing unit 45b in the communication apparatus 30b receives the packet P31 with the outer header added through a receiving unit 34b. The outer header comparing unit 45b determines whether the IP address in the outer header in the received packet is the IP address assigned to a TEP 50b. In this example, the IP address in the outer header has been set at the IP address of the TEP 50b, so the outer header comparing unit 45b outputs the packet to an outer header removing unit 46b. The outer header removing unit 46b removes the outer header from the packet and outputs the resulting packet P31 to a counting unit 54b. The counting unit 54b receives the packet and determines whether the value of the type in the ICMP header in the received packet is 0, which indicates a reply packet. Since the type of the ICMP header in the packet P31 is 8, the packet is not a reply packet. Therefore, the counting unit 54b outputs the packet to the virtual machine 10b. The virtual machine 10b then creates a reply packet as a response to the packet P31. The reply packet includes information described below.

Source MAC address: MA3
Destination MAC address: MA4
VLAN ID: VID2
Ether type: 0x0800
Protocol: ICMP
Source IP address: IP4
Destination IP address: IP3
Type of ICMP header: 0 (Echo Reply)
Code: 0

The virtual machine 10b transmits the created reply packet toward the virtual machine 10a (arrow A4).

In addition, it will be assumed that the packet P32 with the outer header added arrives at the TEP 50b through the path indicated by the arrow A3. In this case as well, the packet P32 is processed in the same way as when the packet P31 with the outer header added arrives, so the packet P32 is output to the virtual machine 10b. The virtual machine 10b then creates a reply packet to the packet P32 and transmits the reply packet toward the virtual machine 10a (arrow A5). The reply packet to the packet P32 includes the same information as the reply packet to the packet P31.

Due to processing indicated by the arrow A4, the reply packet responsive to the packet P31 is input to a packet comparing unit 41b in the TEP 50b. Since the packet comparing unit 41b does not determine that the reply packet is a detection packet, the packet comparing unit 41*b* notifies a hash calculating unit 42*b* and a reproduction count determining unit 52*b* that the reply packet is not a detection packet. In response to the notification from the packet comparing unit 41*b*, the reproduction count determining unit 52*b* notifies a packet reproducing unit 53*b* that the received packet is not a detection packet. The packet reproducing unit 53*b* then outputs the reply packet received from the virtual machine 10*b* to the hash calculating unit 42*b* and an outer header adding unit 43*b*, without reproducing the reply packet.

The hash calculating unit 42*b* calculates a hash value according to the headers in the reply packet and outputs the calculated hash value to the outer header adding unit 43*b*. The outer header adding unit 43*b* adds, to the reply packet output from the packet reproducing unit 53*b*, an outer header in which the value of which the outer header adding unit 43*b* is notified by the hash calculating unit 42*b*. The outer header adding unit 43*b* transmits the reply packet with the outer header added via a transmitting unit 33*b*. The reply packet with the outer header added is forwarded toward the TEP 50*a* through a path indicated by the arrow A6.

Due to processing indicated by the arrow A5, in the case as well in which the reply packet responsive to the packet P32 is input to the packet comparing unit 41*b*, the reply packet is processed similarly to the reply packet to the packet P31. Therefore, after an outer header is added to the reply packet to the packet P32, the reply packet with outer header added is also forwarded toward the TEP 50*a* through the path indicated by the arrow A6.

It will be assumed that the reply packet to the packet P31 has arrived at the communication apparatus 30*a* and that an outer header comparing unit 45*a* in the communication apparatus 30*a* has received the reply packet with the outer header added via a receiving unit 34*a*. Since the IP address in the outer header in the received reply packet is the IP address assigned to the TEP 50*a*, the outer header comparing unit 45*a* outputs the received reply packet to an outer header removing unit 46*a*. The outer header removing unit 46*a* removes the outer header from the reply packet and outputs the resulting reply packet to a counting unit 54*a*. The counting unit 54*a* receives the reply packet. Since the value of the type in the ICMP header in the received reply packet is 0, which indicates a reply packet, the counting unit 54*a* compares the received reply packet with information stored in the storage unit 51*a*. Due to this processing, the counting unit 54*a* determines whether information in the headers in the reply packet matches a reply to one of the detection packets transmitted from the TEP 50*a* in the past. Specifically, the counting unit 54*a* searches for an entry of a detection packet that has a destination address matching the source address in a reply packet and also has a source address matching the destination address in the reply packet. Since the reply packet received at the counting unit 54*a* is a reply packet created by the virtual machine 10*b*, the received reply packet includes information below.

Source MAC address: MA3
Destination MAC address: MA4
VLAN ID: VID2
Ether type: 0x0800
Protocol: ICMP
Source IP address: IP4
Destination IP address: IP3
Type of ICMP header: 0 (Echo Reply)
Code: 0

Therefore, the counting unit 54*a* determines that the received packet is a reply to the detection packet in the entry at No. 2 in FIG. 10. The counting unit 54*a* changes the predicted number of receptions in the entry at No. 2 from 2 to 1. In addition, the counting unit 54*a* discards the reply packet.

It will be assumed that the reply packet to the packet P32 has arrived at the communication apparatus 30*a* after that. Then, the reply packet to the packet P32 is compared with information in the storage unit 51*a*, as with the reply packet to the packet P31. In this case as well, the counting unit 54*a* determines that a reply packet to the detection packet in the entry at No. 2 in FIG. 10 has been received and changes the predicted number of receptions in the entry at No. 2 from 1 to 0.

When the predicted number of receptions becomes 0, the counting unit 54*a* determines that the reply packets responsive to the respective duplicated detection packets have been obtained. The reply packets to the respective duplicated detection packets having been obtained indicates that there is no fault in any forwarding paths that have been used to forward the reproduced detection packets. Then, the counting unit 54*a* outputs the received reply packets to the virtual machine 10*a*.

The virtual machine 10*a* uses the reply packets received from the counting unit 54*a* to determine that there is no fault occurring in the paths from the virtual machine 10*a* to the virtual machine 10*b*. When the virtual machine 10*a* receives the reply packets, the virtual machine 10*a* may output, to the output device 104 included in the communication apparatus 30*a*, information indicating that the paths between the virtual machine 10*a* and the virtual machine 10*b* are ready for communication. Therefore, the operator who is using the virtual machine 10*a* to execute processing may recognize that the paths between the virtual machine 10*a* and the virtual machine 10*b* are ready for communication.

On the other hand, when at least one detection packet has not arrived at the virtual machine 10*b*, only a smaller number of reply packets than the number of reproductions of a detection packet are transmitted to the virtual machine 10*a*. Therefore, the predicted number of receptions counted by the counting unit 54*a* is not reduced to 0, so a reply packet is not output to the virtual machine 10*a*. In this case, since the virtual machine 10*a* does not receive a reply packet within a predetermined time, starting from the transmission of the detection packet, during which the virtual machine 10*a* waits for a reply packet, the virtual machine 10*a* determines that there is a fault occurring in a path.

Although, in the description with reference to FIG. 11, a case in which a reply packet passes through the path indicated by the arrow A6 has been taken as an example, the reply packet may be transmitted to the communication apparatus 30*a* through the switches 20*d*, 20*c*, and 20*a*. The number of switches 20 on the network and the number of reproductions of a detection packet are just an example. These values may be changed according to the implementation.

Figure 12:
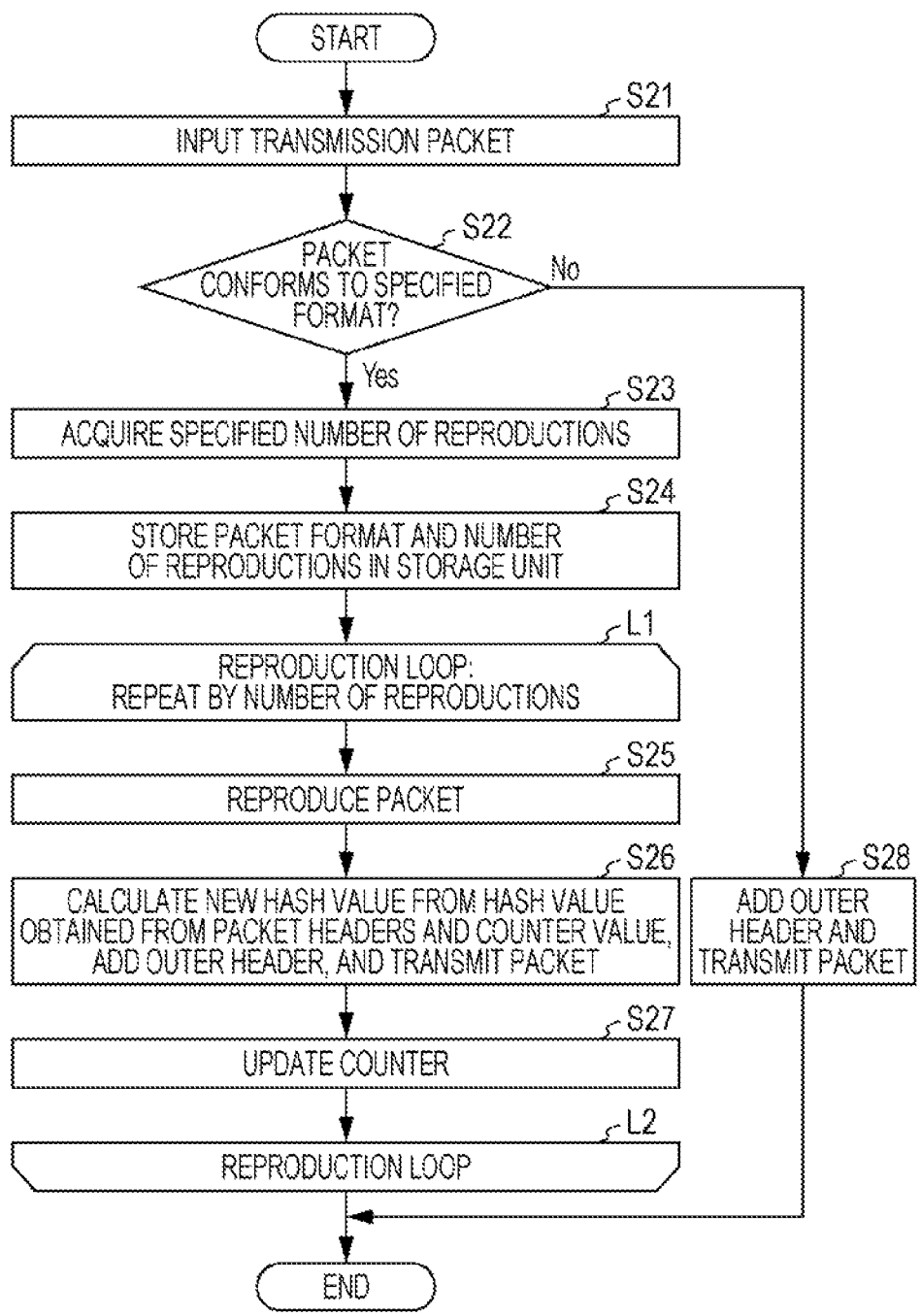
FIG. 12 is a diagram illustrating an example of an operational flowchart for processing performed by a communication apparatus, according to an embodiment.

FIG. 12 is a flowchart illustrating an example of processing executed by a second communication apparatus. In the example in FIG. 12, the number of reproductions is predetermined and the reproduction count determining unit 52 reads the number of reproductions from the memory 102 at an appropriate point in time.

A transmission packet created in the virtual machine 10 is input to the packet comparing unit 41 and packet reproducing unit 53 in the TEP 50 (step S21). The packet comparing unit 41 receives the packet and compares information in the headers in the received packet with matching information to determine whether the packet conforms to the format specified in the matching information (step S22). When the packet conforms the format specified in the matching information (the result in step S22 is Yes), the received packet is a detection packet, so the reproduction count determining unit 52 acquires the number of reproductions specified in advance (step S23). In addition, the information about the format of the packet and the number of reproductions are stored in the storage unit 51 (step S24). In step S24, information in the headers in the packet will be used as information about the format of the packet.

After that, processing between loop ends L1 and L2 is executed the same number of times as the number of reproductions of a detection packet under processing. For convenience of description, processing between the loop ends L1 and L2 will sometimes be referred to below as a reproduction loop. The packet reproducing unit 53 determines whether the total number of transmitted detection packets is equal to the number of reproductions (loop end L1). When the total number of transmitted detection packets is smaller than the number of reproductions, the packet reproducing unit 53 reproduces the detection packet (step S25). The hash calculating unit 42 calculates a new hash value from a counter value and the hash value calculated from the headers in the reproduced detection packet. The outer header adding unit 43 adds, to the packet, an outer header in which the new hash value calculated by the hash calculating unit 42 is specified as the source port number, and transmits the resulting packet (step S26). The hash calculating unit 42 updates the counter value (step S27). After processing in step S27, processing after the loop end L1 is repeated. When the total number of transmitted detection packets reaches the number of reproductions, the packet reproducing unit 53 terminates the processing.

When the packet does not confirm to the format specified in the matching information, the received packet is not a detection packet (the result in step S22 is No). Then, the outer header adding unit 43 adds, to the packet, an outer header in which the hash value calculated by the hash calculating unit 42 is specified as the source port number, and transmits the resulting packet (step S28). The source port number in the outer header added in step S28 is the hash value in a header in the packet under processing.

Figure 13:
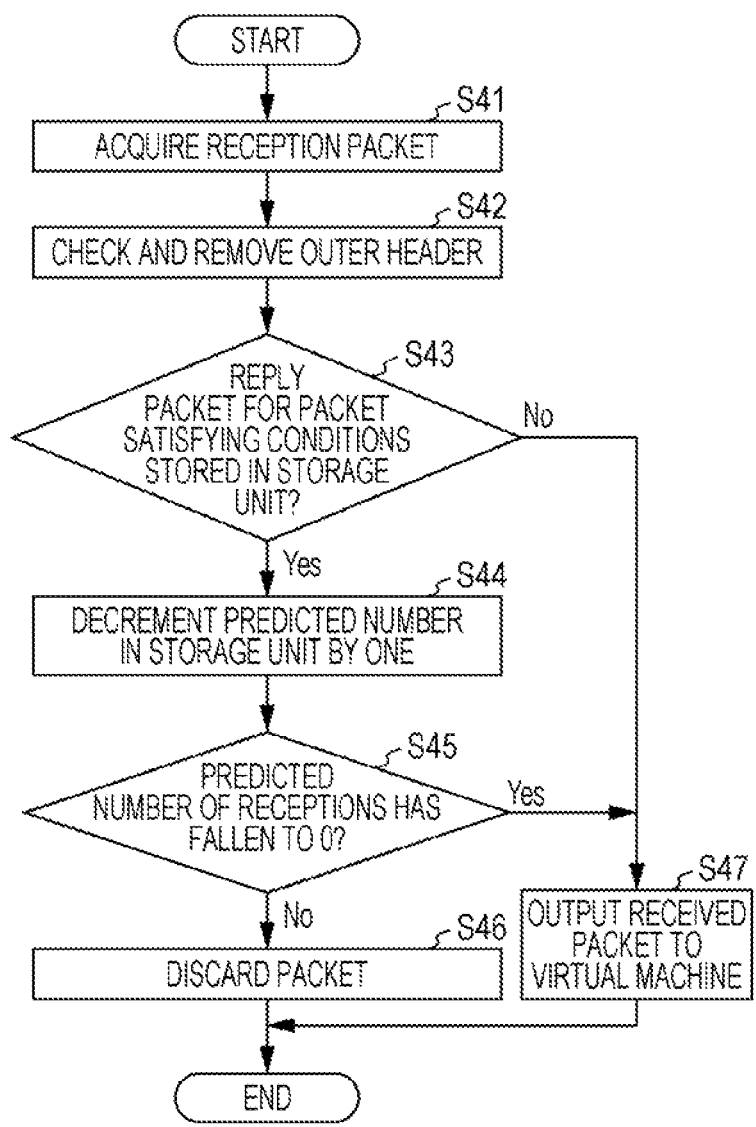
FIG. 13 is a diagram illustrating an example of an operational flowchart for processing performed by a communication apparatus, according to an embodiment.

FIG. 13 is a flowchart illustrating another example of processing executed by the second communication apparatus. The outer header comparing unit 45 acquires a reception packet via the network interface 32 (step S41). The outer header comparing unit 45 checks the outer header in the acquired packet to determine whether the packet is eligible for reception. When the outer header comparing unit 45 determines that the packet is eligible for reception, the outer header comparing unit 45 outputs the packet to the outer header removing unit 46. The outer header removing unit 46 removes the outer header from the packet determined to be eligible for reception and outputs the resulting packet to the counting unit 54 (step S42). The counting unit 54 receives the packet and checks the remaining headers in the packet from which the outer header has been removed to determine whether the received packet is a reply packet to a packet that satisfies the conditions stored in the storage unit 51 (step S43). When the counting unit 54 determines that the packet is a reply packet to a packet that satisfies the conditions stored in the storage unit 51 (the result in step S43 is Yes), the counting unit 54 decrements the predicted number of receptions associated with the conditions for the reception packet by one (step S44). The counting unit 54 then determines whether the predicted number of receptions has fallen to 0 (step S45). When the predicted number of receptions has not fallen to 0 (the result in step S45 is No), the counting unit 54 discards the received packet (step S46), after which the processing is terminated.

On the other hand, when the predicted number of receptions has fallen to 0 (the result in step S45 is Yes), the counting unit 54 outputs the received packet to the virtual machine 10 (step S47), after which the processing is terminated. In the case as well in which the counting unit 54 determines that the packet is not a reply packet to a packet that satisfies the conditions stored in the storage unit 51 (the result in step S43 is No), the counting unit 54 outputs the received packet to the virtual machine 10 (step S47), after which the processing is terminated.

As described above, in the second embodiment, a detection packet is reproduced, and the source port number included in the outer header in each reproduced detection packet is set at the sum of the hash value in the inner header and the value of the counter that takes a different value for each detection packet. Therefore, transmitting one detection packet to detect a fault in a path between the source apparatus and the communication destination allows fault detection in a plurality of paths to the communication destination. Therefore, in a system in which the apparatus according to the second apparatus is used, even if a communication path is duplicated, the virtual machine 10 in the detection packet transmitting source may easily detect a fault.

Third Embodiment

Although, even in the first and second embodiments, the possibility that faults in a plurality of paths are detected is increased, reproduced detection packets may be transmitted through the same path. In view of this, in a third embodiment, an example will be described in which the number of reproductions of a detection packet is set so that the states of all paths are determined at a predetermined probability according to the number of paths used in communication between virtual machines 10. In the third embodiment, processing executed by the reproduction count determining unit 52 in the second embodiment is changed.

The number of paths used in communication between virtual machines 10 may be determined by a communication apparatus 30 by exchanging path information between switches 20 or between communication apparatuses 30. Alternatively, the number of paths may be acquired by a communication apparatus 30 from a management apparatus in which information about all communication paths on the network is held. The number of paths used in communication between virtual machines 10 may be acquired by any known method.

It will be assumed that the number of paths available in communication between the virtual machine 10a and the virtual machine 10b is m. It will be also assumed that when a detection packet is reproduced n times, the number of paths for which whether there is a fault is checked is k. Then, assuming that all paths have the same probability of being selected, the possibility that whether there is a fault is checked for k paths is represented as in equation (2).

$$P(m, n, k) = \binom{m}{k} \sum_{i=1}^{k} (-1)^{k-i} \binom{k}{i} \left(\frac{i}{m}\right)^n \quad (2)$$

The possibility that whether there is a fault is checked for all paths is represented as in equation (3).

$$P(m, n) = \sum_{i=1}^{m} (-1)^{m-i} \binom{m}{i} \left(\frac{i}{m}\right)^n \quad (3)$$

When equation (3) is used, a relationship between the probability (coverage) that fault detection is possible in all paths and the number of reproduced detection packets is obtained.

FIG. 14 illustrates an example of correspondence between the number of reproductions and the coverage. Specifically, FIG. 14 illustrates an example of relationships, in the case in which there are four paths, between the numbers of reproductions of a detection packet and the probabilities that fault detection is possible in all paths, which are obtained as a result of calculation performed by using equation (3). In the example in FIG. 14, when the number of reproductions of a detection packet is 4, four detection packets are used but the probability that fault detection is possible in all paths is 9%. Similarly, when the number of reproductions of a detection packet is 10, the probability that fault detection is possible in all paths is 78%. When the number of reproductions of a detection packet is 15, the probability that fault detection is possible in all paths is 95%. When the number of reproductions of a detection packet is 20, the probability that fault detection is possible in all paths is 99%.

A table, as illustrated in FIG. 14, that represents relationships between the numbers of reproductions and the coverages may be stored in the reproduction count determining unit 52 for a plurality of paths. When the reproduction count determining unit 52 acquires the number of communication paths for detection packets to be created by reproduction, the reproduction count determining unit 52 references a table associated with the acquired value and determines the number of reproductions at which a predetermined coverage is obtained as the number of reproductions of a detection packet. Processing executed after the number of reproductions is determined is the same as in the second embodiment.

As described above, in the third embodiment, the number of reproductions of a detection packet is determined according to the number of paths for which whether there is a fault is checked. Therefore, when one detection packet used to detect a fault in a path between the source apparatus and the communication destination is transmitted from the source apparatus, whether there is a fault may be determined for all paths to the communication destination at a coverage corresponding to one of a plurality of numbers of reproductions. Therefore, in a system in which the apparatus according to the third apparatus is used, even if a communication path is duplicated, the virtual machine 10 in the detection packet transmitting source may easily detect a fault.

Fourth Embodiment

In a fourth embodiment, an example of a system will be described in which a management apparatus 80 communicates with communication apparatuses 30 and forwarding apparatuses 70 to identify a transmission source and transmission destination of a detection packet that has passed through individual apparatuses and determines whether there is a fault in a communication path.

Figure 15:
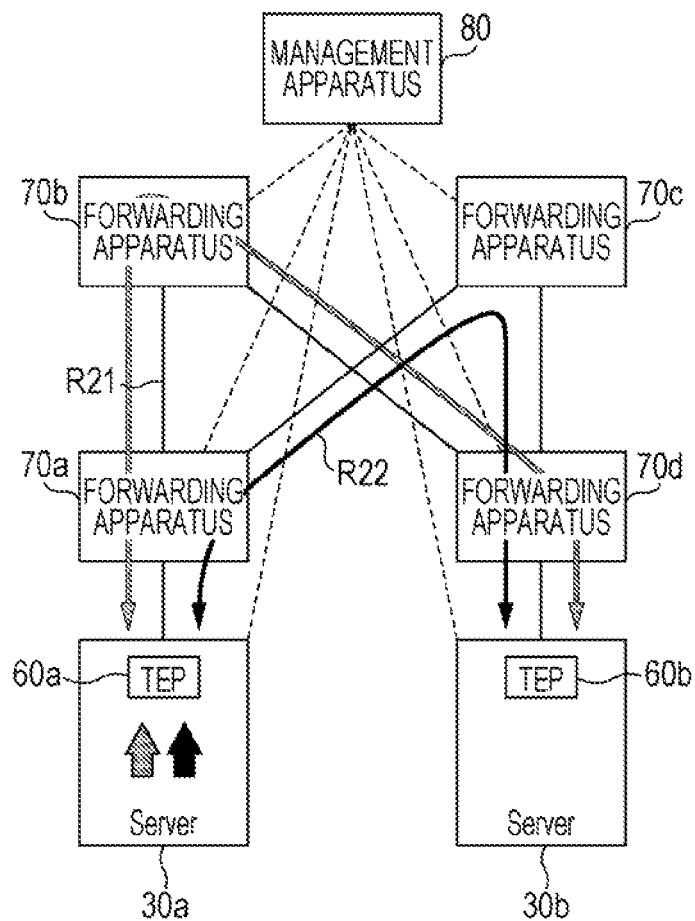
FIG. 15 is a diagram illustrating an example of a communication system, according to an embodiment.

FIG. 15 illustrates an example of a communication system. The communication system includes the management apparatus 80, communication apparatuses 30 (30a and 30b) that perform communication, and forwarding apparatuses 70 (70a to 70d) that forward a packet used in communication between communication apparatuses 30. It will be assumed in the description below that a path R21 passing through the forwarding apparatus 70a, forwarding apparatus 70b, and forwarding apparatus 70d and a path R22 passing through the forwarding apparatus 70a, forwarding apparatus 70c, and forwarding apparatus 70d are provided between the communication apparatus 30a and the communication apparatus 30b. It will be also assumed that the management apparatus 80 is coupled to the communication apparatuses 30 and forwarding apparatuses 70 in the communication system through a control network that transmits and receives a control packet. In FIG. 15, connections on the control network are indicated by dotted lines. Each communication apparatus 30 used in the fourth embodiment includes a TEP 60.

Figure 16:
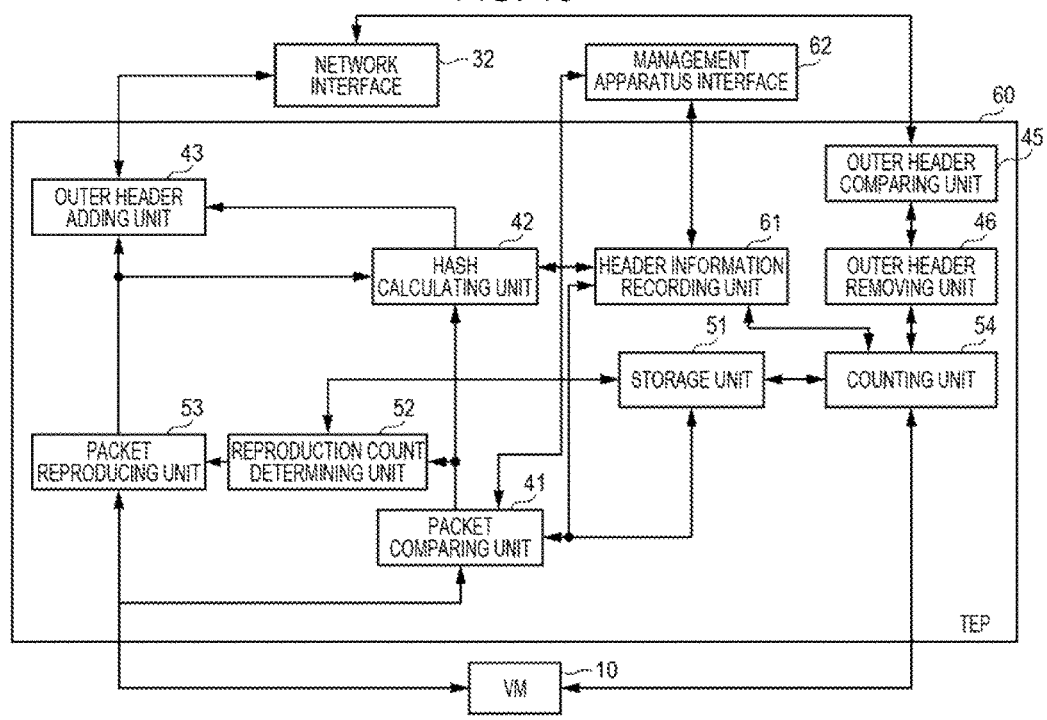
FIG. 16 is a diagram illustrates an example of a configuration of a TEP, according to an embodiment.

FIG. 16 illustrates an example of the structure of the TEP 60. The TEP 60 includes a header information recording unit 61 and a management apparatus interface 62. The TEP 60 further includes the packet comparing unit 41, hash calculating unit 42, outer header adding unit 43, outer header comparing unit 45, outer header removing unit 46, storage unit 51, reproduction count determining unit 52, packet reproducing unit 53, and counting unit 54. In the fourth embodiment as well, processing executed by the hash calculating unit 42, outer header adding unit 43, outer header comparing unit 45, outer header removing unit 46, storage unit 51, reproduction count determining unit 52, packet reproducing unit 53, and counting unit 54 is the same as in the second or third embodiment.

The header information recording unit 61 records information used to identify the start point and end point of a target segment within which a detection packet is passed to detect a fault. In the fourth embodiment, upon detecting a detection packet, the packet comparing unit 41 outputs information in the headers in the detection packet to the storage unit 51 and header information recording unit 61. Therefore, the destination address, source address, and other information in the detection packet transmitted from the relevant TEP 60 may be recorded in the header information recording unit 61. When the counting unit 54 determines that a received packet is a detection packet from which the outer header has been removed, the header information in the detection packet and the destination port number in the outer header that had been added to the detection packet are recorded in the header information recording unit 61. In the fourth embodiment, the outer header removing unit 46 outputs the packet from which the outer header has been removed to the counting unit 54 in association with the information in the outer header that had been added to the packet.

The management apparatus interface 62 transmits information in the header information recording unit 61 to the management apparatus 80 at an appropriate point of time. In this transmission, information used by the management apparatus 80 to uniquely identify the communication apparatus 30 including the TEP 60 is also transmitted together with the information in the header information recording unit 61. When the management apparatus interface 62 receives matching information from the management apparatus 80, the management apparatus interface 62 outputs the matching information to the packet comparing unit 41. The packet comparing unit 41 stores the matching information received from the management apparatus interface 62. The management apparatus interface 62 is implemented by the network interface 32. The header information recording unit 61 is implemented by the memory 102.

Figure 17:
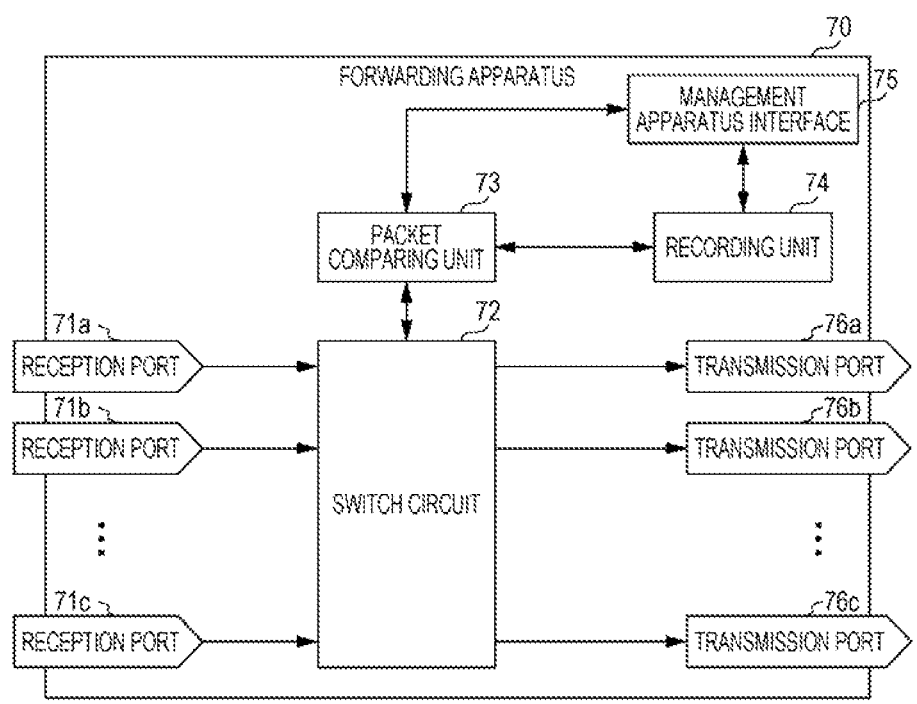
FIG. 17 is a diagram illustrating an example of a configuration of a forwarding apparatus, according to an embodiment.

FIG. 17 illustrates an example of the structure of the forwarding apparatus 70. The forwarding apparatus 70 includes reception ports 71 (71a to 71c), a switch circuit 72, a packet comparing unit 73, a recording unit 74, a management apparatus interface 75, and transmission ports 76 (76a to 76c). Each reception port 71 receives a packet from another forwarding apparatus 70 or the relevant communication apparatus 30. Each switch circuit 72 executes switching processing. The packet comparing unit 73 snoops a packet switched at the switch circuit 72 to acquire header information in a packet to be forwarded. The packet comparing unit 73 further monitors the passing of a detection packet with reference to the acquired header information and records an obtained result in the recording unit 74. For example, information in the outer header and inner header in a packet determined by the packet comparing unit 73 to be a detection packet is recorded in the recording unit 74. The management apparatus interface 75 transmits information recorded in the recording unit 74 to the management apparatus 80 at an appropriate point of time. Each transmission port 76 forwards a packet to another forwarding apparatus 70, and the relevant communication apparatus 30.

Each forwarding apparatus 70 includes the processor 101, memory 102, and network interface 32. The forwarding apparatus 70 may also include hardware components as illustrated in FIG. 8. Each reception port 71, the management apparatus interface 75, and each transmission port 76 are implemented by the network interface 32. The packet comparing unit 73 is implemented by the processor 101. The recording unit 74 is implemented by the memory 102.

Figure 18:
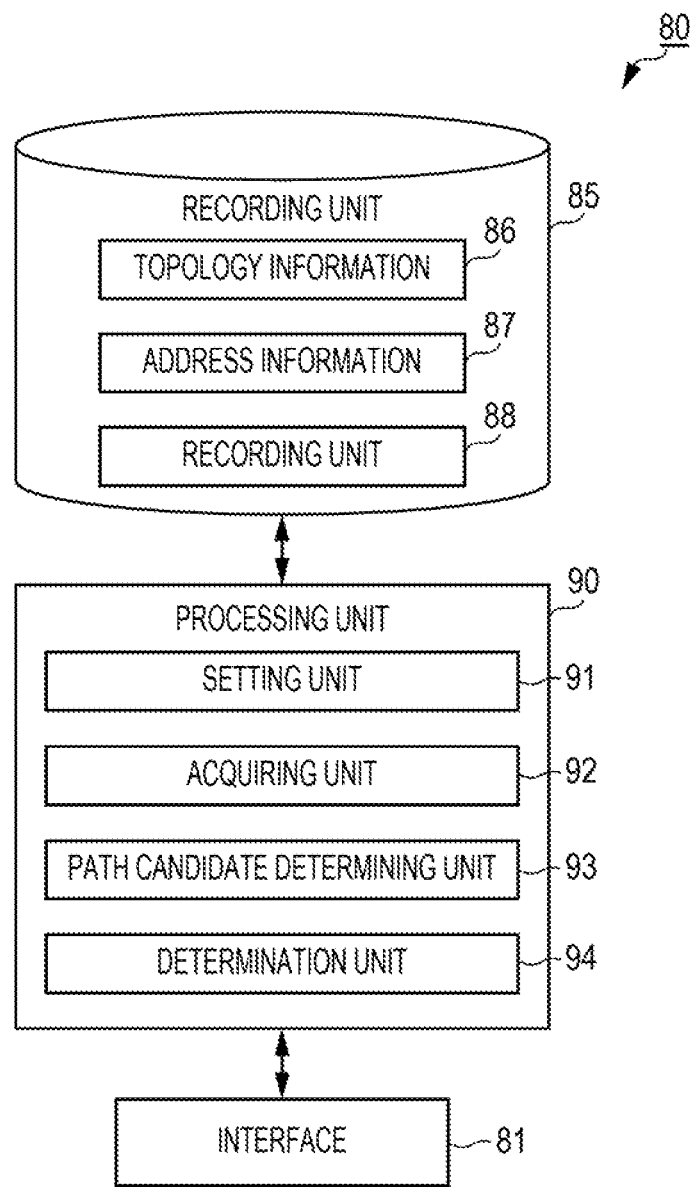
FIG. 18 is a diagram illustrating an example of a configuration of a management apparatus, according to an embodiment.

FIG. 18 illustrates an example of the structure of the management apparatus 80. The management apparatus 80 includes an interface 81, a recording unit 85, and a processing unit 90. The recording unit 85, which stores topology information 86 and address information 87, operates as a recording unit 88. The processing unit 90 includes a setting unit 91, an acquiring unit 92, a path candidate determining unit 93, and a determination unit 94. The interface 81 transmits and receives a control packet to and from communication apparatuses 30 and forwarding apparatuses 70. The management apparatus 80 may also include hardware components illustrated in FIG. 8. The interface 81 is implemented by the network interface 32. The processing unit 90 is implemented by the processor 101. The recording unit 85 is implemented by the memory 102.

The setting unit 91 creates a request to set information in the communication apparatuses 30 or forwarding apparatuses 70, a request to delete a record, and the like. The acquiring unit 92 periodically acquires, from the communication apparatuses 30 and forwarding apparatuses 70, information that represents a detection packet passing state. The path candidate determining unit 93 determines communication paths available in communication between the transmission source and transmission destination of a detection packet as candidate paths, with reference to information on the transmission source and transmission destination of the detection packet acquired from the communication apparatus 30, the topology information 86, and the address information 87. Processing performed by the path candidate determining unit 93 will be described later in detail. For each candidate path, the determination unit 94 references information acquired from the communication apparatuses 30 and forwarding apparatuses 70 and determines whether the passing of the detection packet has been confirmed at all forwarding apparatuses 70 included in the candidate path. When the passing of the detection packet is conformed at all forwarding apparatuses 70 included in the candidate path, the determination unit 94 determines that there is no fault in the candidate path.

The topology information 86 represents a connection relationship used to identify a communication path in the communication system. The address information 87 is used to identify the address of a virtual machine 10 or the like operating in the relevant communication apparatus 30. An example of the topology information 86 will be described later with reference to FIG. 19. An example of the address information 87 will be described later with reference to FIG. 20. The passing state of a detection packet is recorded in the recording unit 88, the passing state being represented by information that the management apparatus 80 acquired from the communication apparatuses 30 and forwarding apparatuses 70. An example of information stored in the recording unit 88 will be described later.

FIG. 18 just illustrates an example of the management apparatus 80. The management apparatus 80 may further include the input device 103 and output device 104 as illustrated in FIG. 8. When the management apparatus 80 includes a display as the output device 104, a decision result made by the determination unit 94 may be displayed on the display. Therefore, the operator of the management apparatus 80 is able to determine from an output result from the determination unit 94 whether there is a fault occurring on at least one of paths between particular communication apparatuses. With reference to the situation of a generated fault, the situation being given on the display, the operator is able to also infer the location of the fault on the network and execute processing to recover from the fault. When the input device 103 is included in the management apparatus 80, the operator is also able to input matching information, which is used at TEPs 60 and forwarding apparatuses 70, to the management apparatus 80. Then, the setting unit 91 in the management apparatus 80 is able to use the information input from the input device 103 to set new matching information in the TEPs 60 and forwarding apparatuses 70 on the network.

Figure 19:
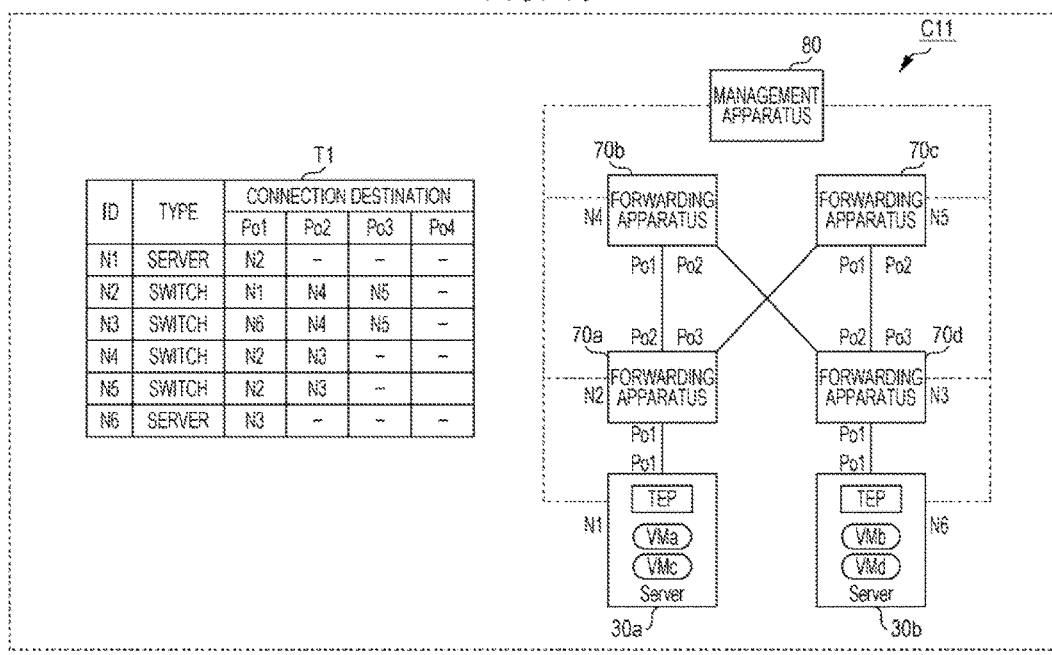
FIG. 19 is a diagram illustrating an example of topology information, according to an embodiment.

FIG. 19 illustrates an example of the topology information 86. Case C11 in FIG. 19 illustrates in detail an example of connections among the apparatuses in the system in FIG. 15. The management apparatus 80 assigns a node ID to each apparatus so that it is uniquely identified. In case C11, the node ID of the communication apparatus 30a is N1 and the node ID of the communication apparatus 30b is N6. In addition, the node ID of the forwarding apparatus 70a is N2, the node ID of the forwarding apparatus 70b is N4, the node ID of the forwarding apparatus 70c is N5, and the node ID of the forwarding apparatus 70d is N3. In FIG. 19 as well, connections used to transmit and receive control packets are indicated by dotted lines. Data packets and detection packets are transmitted and received through connections indicated by bold lines. In the description below, it will be assumed that the virtual machine 10a (VMa) and virtual machine 10c (VMc) are operating in the communication apparatus 30a and the virtual machine 10b (VMb) and a virtual machine 10d (VMd) are operating in the communication apparatus 30b.

The management apparatus 80 also stores information indicating which port of an individual apparatus is coupled to which apparatus as the topology information 86. The topology information 86 in case C11 is as illustrated in a table T1 in FIG. 19. In the table T1, the port Po1 of the communication apparatus 30a (N1) is coupled to the port Po1 of the forwarding apparatus 70a (N2), the port Po2 of the forwarding apparatus 70a (N2) is coupled to the port Po1 of the forwarding apparatus 70b (N4), and the port Po3 of the forwarding apparatus 70a (N2) is coupled to the port Po1 of the forwarding apparatus 70c (N5). At the forwarding apparatus 70d (N3), the port Po1 is coupled to the port Po1 of the communication apparatus 30b (N6), the port Po2 is coupled to the port Po2 of the forwarding apparatus 70b (N4), and the port Po3 is coupled to the port Po2 of the forwarding apparatus 70c (N5).

FIG. 20 illustrates an example of the address information 87. The address information 87 includes addresses assigned to virtual machines 10 operating in communication apparatuses 30 in the communication system and the node IDs of the communication apparatuses 30 in which these virtual machines 10 are operating, in correspondence to each other. In the system in case C11 in FIG. 19, the address information 87 in FIG. 20 is used. That is, in the communication apparatus 30a, the virtual machine 10a (VMa) and virtual machine 10c (VMc) are operating, and the node ID of the communication apparatus 30a is N1. Therefore, the virtual machine 10a and virtual machine 10c are associated with the node ID denoted N1. In addition, the virtual machine 10a is assigned an address of IPa, and the virtual machine 10c is assigned an address of IPc.

In the communication apparatus 30b, the virtual machine 10b (VMb) and virtual machine 10d (VMd) are operating, and the node ID of the communication apparatus 30b is N6. Therefore, the virtual machine 10b and virtual machine 10d are assigned the node ID denoted N6. Also, the virtual machine 10b is assigned an address of IPb, and the virtual machine 10d is assigned an address of IPd.

In the communication system illustrated in case C11 in FIG. 19, it will be assumed that a plurality of detection packets have been transmitted from the virtual machine 10a (VMa) toward the virtual machine 10b (VMb). The plurality of detection packets may have been individually created as in the first embodiment or may have been reproduced in one TEP as described in the second and third embodiments. The headers of each detection packet include information below.

Source MAC address: MA2
Destination MAC address: MA1
VLAN ID: VID1
Ether type: 0x0800
Protocol: ICMP
Source IP address: IPa
Destination IP address: IPb
Type of ICMP header: 8 (Echo Request)
Code: 0

When a detection packet is output from the communication apparatus 30a to the TEP 60a, the packet comparing unit 41a references the matching information (see FIG. 5) and detects that a detection packet has been received. Along with the detection of the detection packet by the packet comparing unit 41, information in the headers in the detection packet is output to the storage unit 51 and header information recording unit 61.

FIG. 21 illustrates an example of information stored in the header information recording unit 61. A header information recording unit 61a included in the communication apparatus 30a, from which a detection packet has been transmitted, stores header information received from the packet comparing unit 41a as information about the detection packet. When the packet comparing unit 41a notifies the hash calculating unit 42a that a detection packet has been detected, a value calculated from a counter value and the hash value in a header in the detection packet is obtained as a source port number. The value obtained at the hash calculating unit 42a is output to the outer header adding unit 43a and header information recording unit 61a as a source port number. Therefore, the source port number that has been set so as to match the matching information is also recorded in the header information recording unit 61a. It will be assumed here that a detection packet used to detect a fault in a segment from the virtual machine 10a to the virtual machine 10b has been transmitted and that the value of the source port number in the outer header has been calculated as A. Then, information at entry No. 1 in FIG. 21 is recorded. Processing to set the outer header and processing to forward a packet with the outer header added are the same as in the first to third embodiments.

It will be assumed that a detection packet has been forwarded from the communication apparatus 30a to the forwarding apparatus 70a. When a reception port 71 of the forwarding apparatus 70a receives the detection packet, the reception port 71 outputs the detection packet from the transmission port 76 that is determined as an output destination in switching processing at the switch circuit 72. At that time, the packet comparing unit 73 snoops a packet to be switched at the switch circuit 72 to acquire information in the outer header and inner header in the packet to be forwarded and identifies the type of the packet. The packet comparing unit 73 identifies the detection packet with reference to the inner header in the packet. The method by which the packet comparing unit 73 identifies a detection packet is the same as the method used by the packet comparing unit 41 in the communication apparatus 30 and the like. When the packet comparing unit 73 determines that the encapsulated detection packet is eligible for forwarding, the packet comparing unit 73 records information of both the outer header and inner header in the recording unit 74. In each forwarding apparatus 70, therefore, the source port number used in the outer header and information of the headers in the detection packet itself are stored in the recording unit 74.

In another forwarding apparatus 70 as well that has received the packet from the forwarding apparatus 70a, the same processing is executed. Therefore, in the forwarding apparatus 70 that has received a packet obtained by encapsulating a detection packet, information of the outer header and inner header in the detection packet is stored in the recording unit 74.

At the communication apparatus 30b that has received the detection packet, processing to remove the outer header from the received packet and other processing are executed as in the first to third embodiments. The outer header removing unit 46 outputs a packet resulting from removing the outer header to the counting unit 54. The counting unit 54 receives the packet and determines whether the packet is a detection packet. When the packet is a detection packet, the counting unit 54 outputs header information of the detection packet and the source port number in the outer header to the header information recording unit 61. The header information recording unit 61 receives the header information and the source port number in the outer header from the counting unit 54, and records the header information and source port number as well, as information about the detection packet that has arrived at the header information recording unit 61. Therefore, in the communication apparatus 30 as well at which a detection packet has arrived, information of the detection packet is recorded in the header information recording unit 61.

In the communication apparatus 30, header information that is the same as information recorded in the header information recording unit 61 is not stored redundantly.

Similarly, in the forwarding apparatus 70 as well, header information that is already stored in the recording unit 74 is not stored redundantly in the switch circuit 72. However, even if information includes matching information (information in the inner header) that matches, when the information has a different source port number in the outer header, the information is stored in the header information recording unit 61 and recording unit 74 as different information. If, for example, the hash calculating unit 42a in the TEP 60a calculates B as the source port number in the outer header in a detection packet transmitted from the virtual machine 10a to the virtual machine 10b, information at entry No. 2 in FIG. 21 is added.

The acquiring unit 92 in the management apparatus 80 periodically requests the communication apparatuses 30 to transmit issue information. The acquiring unit 92 further requests the forwarding apparatuses 70 to transmit pass information. The issue information is information about a detection packet transmitted from one of the communication apparatuses 30. If the communication apparatus 30 has passed a detection packet destined for the virtual machine 10 operating in the communication apparatus 30, the issue information additionally includes information of the inner header and the source port number in the outer header, included in the detection packet that has been passed. Pass information is information about a detection packet that has passed through a forwarding apparatus 70. The acquiring unit 92 issues requests for issue information and pass information through the interface 81.

Each communication apparatus 30 acquires a request for issue information through the management apparatus interface 62 in the TEP 60. The management apparatus interface 62 transmits information stored in the header information recording unit 61 to the management apparatus 80 in response to the acquired request for issue information. Each forwarding apparatus 70 acquires a request for pass information through the management apparatus interface 75. The management apparatus interface 75 transmits information stored in the recording unit 74 to the management apparatus 80 in response to the acquired request for pass information.

Figure 22:
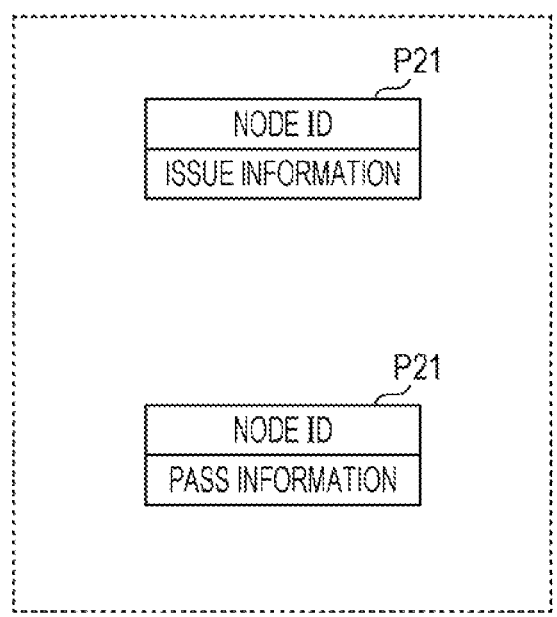
FIG. 22 is a diagram illustrating an example of information in a control packet, according to an embodiment.

FIG. 22 illustrates an example of information in a control packet. A packet P21 is an example of a payload in a control packet that indicates issue information. Issue information is transmitted in association with the node ID identifying the communication apparatus 30 that transmits the information. The issue information is information recorded in the header information recording unit 61. A packet P22 is an example of a payload in a control packet that indicates pass information. Pass information is transmitted in association with the node ID identifying the forwarding apparatus 70 that transmits the information. The pass information is information on the outer header and inner header recorded in the recording unit 74.

For example, it will be assumed that when the communication apparatus 30a has transmitted a detection packet from the virtual machine 10a toward the virtual machine 10b, the management apparatus 80 outputs a request for issue information to the TEP 60a. Then, the management apparatus interface 62 transmits all information stored in the header information recording unit 61 to the management apparatus 80 together with a node ID (N1), as issue information. When detection packets to be passed through a plurality of segments are created in a virtual machine 10, since information about a detection packet used to detect a fault has been recorded in the header information recording unit 61 for each segment, information about the plurality of segments is included in the issue information. If, for example, a detection packet used to detect a fault in a segment from the virtual machine 10a to the virtual machine 10b and a detection packet used to detect a fault in a segment from the virtual machine 10a to the virtual machine 10d are concurrently created in the virtual machine 10a, information about these segments is included in one piece of issue information.

A case in which the management apparatus 80 requests the management apparatus interface 62b in the communication apparatus 30b to transmit issue information will be described next. It will be assumed that no packet has been created in the virtual machine 10b in the communication apparatus 30b but the TEP 60b has passed a detection packet destined for the virtual machine 10b from the virtual machine 10a. In this case, the header information recording unit 61b includes information of the inner header in the detection packet destined for the virtual machine 10b from the virtual machine 10a and the source port number in the outer header that has been added to the detection packet.

Figure 23:
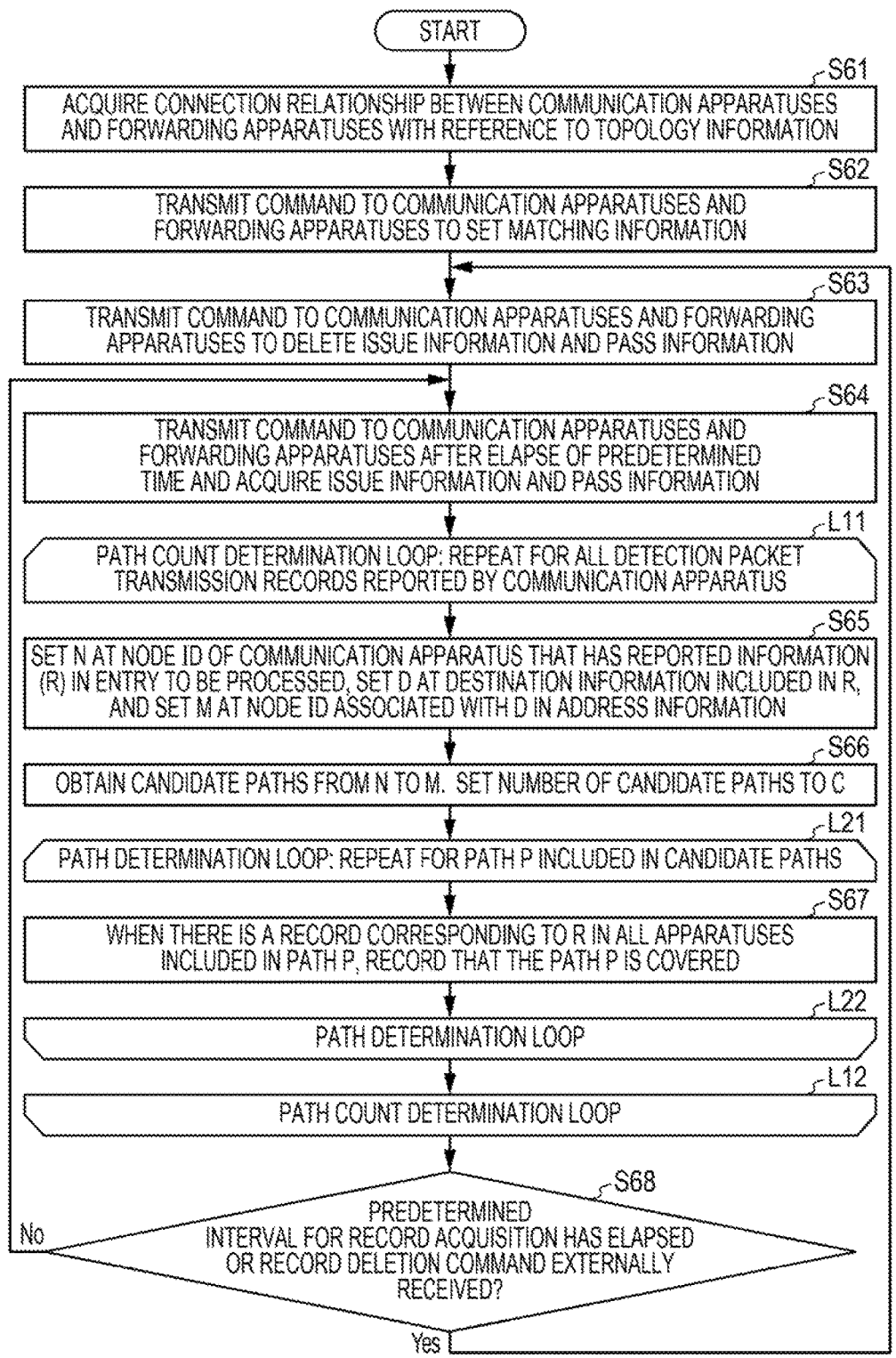
FIG. 23 is a diagram illustrating an example of an operational flowchart for processing performed by a management apparatus, according to an embodiment.

FIG. 23 is a flowchart illustrating an example of processing executed by the management apparatus 80. An example of decision processing executed in the fourth embodiment will be descried below with reference to FIG. 23. FIG. 23 just illustrates an example. The processing procedure may be changed according to the implementation; for example, the order of steps S62 and S63 may be changed.

The path candidate determining unit 93 acquires a connection relationship between communication apparatuses 30 and forwarding apparatuses 70 with reference to the topology information 86 (step S61). The setting unit 91 transmits a command to the communication apparatuses 30 and forwarding apparatuses 70 to set matching information used in each apparatus (step S62). The setting unit 91 transmits another command to the communication apparatuses 30 and forwarding apparatuses 70 to delete issue information recorded in the header information recording unit 61 in each communication apparatus 30 and pass information recorded in the recording unit 74 in each forwarding apparatus 70 (step S63).

Even after issue information and pass information have been deleted, a detection packet is transmitted from the virtual machine 10 in the communication apparatus 30 toward a communication destination and other processing is executed. Therefore, even after processing in step S63 has been executed, issue information and pass information are updated as descried above with reference to FIGS. 21 and 22. Accordingly, to acquire issue information and pass information, the acquiring unit 92 transmits a command to the communication apparatuses 30 and forwarding apparatuses 70 after the elapse of a predetermined time from the completion of processing in step S63 (step S64).

Next, processing between loop ends L11 and L12 is executed for each entry recorded in relation to detection packet transmission, the entry being reported by the communication apparatus 30. For convenience of description, processing between the loop ends L11 and L12 will be referred to below as a path count determination loop. For each entry recorded in relation to detection packet transmission in the issue information reported by the communication apparatus 30, the path candidate determining unit 93 determines whether the number of paths from the transmission source to the transmission destination has been determined (loop end L11). When the number of paths has not been determined for all entries related to detection packet transmission, the path candidate determining unit 93 selects an entry R to be processed and sets the values of variables D, M and N for the entry R, these values being used in subsequent processing (step S65). Specifically, the variable N is set at the node ID of the communication apparatus 30 that has submitted a notification of information (R) in the entry to be processed, the variable D is set at the destination address in the detection packet that has been transmitted as indicated in the information (R) in the entry to be processed, and the variable M is set at a node ID associated with the address set in the variable D in the address information 87.

When, for example, information at entry No. 1 in FIG. 21 is to be processed, information below is read into the path candidate determining unit 93.

Node ID of notification source: N1 (communication apparatus 30a)

Destination IP address (inner header): IPb

Source port number (outer header): A

In this case, the path candidate determining unit 93 sets the variable N at N1. The entry to be processed is an entry in which information, included in pass information, about detection packet transmission is stored. Therefore, processing to set the variable N is equivalent to processing to identify the apparatus in which the virtual machine 10 that has transmitted the detection packet is operating. The path candidate determining unit 93 sets the variable D at IPb next. The path candidate determining unit 93 then identifies that the node ID of the apparatus associated with the address of IPb is N6, with reference to the address information 87 (see FIG. 20), and sets the variable M at N6. In the address information 87, the address of an individual virtual machine 10 and the communication apparatus 30 in which the virtual machine 10 is operating are associated with each other. Therefore, processing to set the variable M is equivalent to processing to identify the apparatus 30 in which the virtual machine 10 set as the transmission destination of the detection packet to be transmitted is operating. In other words, when the variables N and M are set, the node ID of the physical communication apparatus 30 in which the transmission source of a detection packet is accommodated and the node ID of the physical communication apparatus 30 in which the transmission destination of the detection packet is accommodated are identified.

After having set the variables, the path candidate determining unit 93 obtains candidate paths from the communication apparatus 30 to which the node ID of the variable N is assigned to the communication apparatus 30 to which the node ID of the variable M is assigned, and sets the number of obtained candidate paths at C (step S66). When, for example, information at entry No. 1 in FIG. 21 is to be processed, the number of paths from the node N1 (communication apparatus 30a) to the node N6 (communication apparatus 30b) is determined from the topology information 86. In this example, the path R21 and path R22 are present as illustrated in FIG. 15, so the number C of candidate paths is 2.

After the number of candidate paths has been determined, processing between loop ends L21 and L22 is executed for each candidate path. For convenience of description, processing between the loop ends L21 and L22 will be referred to below as a path determination loop. For each candidate path, the determination unit 94 determines whether processing of the path determination loop from the transmission source to the transmission destination has been executed (loop end L21). When processing of the path determination loop from the transmission source to the transmission destination has not been executed for a candidate path, the determination unit 94 determines whether information associated with the entry R under processing has been obtained for each apparatus included in the path P under processing, where the information associated with the entry R under processing is information that associates the source port number in the outer header indicated in the entry under processing with the inner header in a detection packet. When the information associated with the entry R under processing has been obtained from all communication apparatuses 30 and all forwarding apparatuses 70 included in the path P, the determination unit 94 determines that the path P is covered as a target in processing to determine whether there is a fault occurring in the path P (step S67). A detection packet has passed through all apparatuses on the path that has been confirmed to be covered in processing in step S67, so there is no fault occurring in the path. After processing in step S67, processing subsequent to the loop end L21 is repeatedly executed. When processing in the path determination loop is terminated, processing subsequent to the loop end L11 is repeatedly executed.

After that, when a predetermined interval during which records are acquired has elapsed or a record deletion command is externally received, the setting unit 91 executes processing in step S63 (Yes in step S68). Processing subsequent to step S64 is then executed. When neither the predetermined interval has elapsed nor a record deletion command is externally received, processing subsequent to step S64 is executed (No in step S68).

FIG. 24 illustrates an example of information stored in the recording unit 88. An example of processing in the determination loop will be described below with reference to FIG. 24. The recording unit 88 records issue information and pass information acquired in processing by the acquiring unit 92 for each node ID. Although FIG. 24 indicates only information related to a detection packet transmitted from the virtual machine 10a to the virtual machine 10b to simplify the drawing, in practice, information items related to a plurality of detection packets may be recorded in parallel in the recording unit 88.

A column at time t1 indicates the state of the recording unit 88 immediately after the management apparatus 80 has requested each relevant apparatus to delete issue information or pass information as in step S63 in FIG. 23. The setting unit 91 in the management apparatus 80 requests each relevant apparatus to delete issue information or pass information and also initializes information recorded in the recording unit 88, so information of which the management apparatus 80 was notified in the past is deleted.

At time t2, the acquiring unit 92 acquires issue information from communication apparatuses 30 and also acquires pass information from forwarding apparatuses 70. The acquiring unit 92 then classifies the acquired information for each of the node IDs assigned to the apparatuses that have notified the acquiring unit 92 of the information, and records the classified information in the recording unit 88. It will be assumed that at time t2, information about a packet is obtained from apparatuses to which N1, N2, N3, N4, and N6 are assigned as a node ID, the packet being obtained by adding an outer header including a source port number set at A to a detection packet transmitted from the virtual machine 10a to the virtual machine 10b. FIG. 24 indicates only information about the detection packet transmitted from the virtual machine 10a to the virtual machine 10b. For easy understanding, therefore, a rectangle including a source port number in the outer header is illustrated as information obtained from one apparatus.

After information at time t2 has been obtained, the determination unit 94 determines, for the paths R21 and R22, whether the passing of the detection packet has been confirmed in the path determination loop. At time t2, the passing of the detection packet in which the source port number is set at A has been confirmed at the forwarding apparatus 30a (N1), forwarding apparatus 70a (N2), forwarding apparatus 70d (N3), forwarding apparatus 70b (N4), and communication apparatus 30b (N6). Therefore, the determination unit 94 determines that the detection packet has been transmitted through the path R21 at a point of time t2. For the path R22, however, the transmission of a detection packet has not been confirmed at time t2.

It will be assumed that at time t3, the acquiring unit 92 acquired issue information from communication apparatuses 30 and also acquired pass information from forwarding apparatuses 70. Then, recording in the recording unit 88 is performed in the same way as in processing at time t2. It will be also assumed that at time t3, information about a packet is obtained from apparatuses to which N1, N2, N3, N5, and N6 are assigned as a node ID as illustrated in FIG. 24, the packet being obtained by adding an outer header including a source port number set at B to a detection packet transmitted from the virtual machine 10a to the virtual machine 10b.

After information at time t3 has been obtained, the determination unit 94 determines, for the paths R21 and R22, whether the passing of the detection packet has been confirmed in the path determination loop. For the path R21, the passing of the detection packet has been confirmed from the information obtained at time t2. According to the information newly obtained at time t3, the passing of the detection packet in which the source port number is set at B has been confirmed at the communication apparatus 30a (N1), forwarding apparatus 70a (N2), forwarding apparatus 70d (N3), forwarding apparatus 70c (N5), and communication apparatus 30b (N6). Therefore, the determination unit 94 determines that the detection packet has been transmitted through the path R22 at a point of time t3. The determination unit 94 then determines that a detection packet has passed through both the path R21 and the path R22 without a trouble.

When the management apparatus 80 includes the output device 104 as described above with reference to FIG. 18, determination results made by the determination unit 94 may be output to the output device 104. For paths in which to detect faults as illustrated in FIG. 24, for example, changes with time in the passing of a detection packet and the presence or absence of a fault in each path may be displayed on a display. This enables the operator to set a bypass circuit or perform maintenance on the network with reference to detection results.

As described above, in the fourth embodiment, after the management apparatus 80 identifies all paths used in communication between communication apparatuses 30, the management apparatus 80 is able to determine for each path whether a detection packet passes through the path, from information in the headers in the packet that has passed through the path. Therefore, in a system as well in which a plurality of paths are set, it is possible to reliably determine whether there is a fault occurring in each path.

Others

Embodiments are not limited to those described above. Various modifications are possible. Some examples will be described below.

Although a case in which a variable that takes a different value for each detection packet has been described as an example, this is just an example. For example, a variable that takes a different value for each detection packet may take values in an arithmetic progression such as values with a common difference of 2 or 3. Alternatively, the hash calculating unit 42 may use a certain table such as a random number table to create a variable. In addition, although a case in which the value of a variable that takes a different value for each different detection packet is added to the hash value in the inner header has been described, the calculation on the hash value and the value of the variable that takes a different value for each detection packet may be arbitrarily changed according to the implementation. For example, at least one of addition, subtraction, multiplication and division may be used in calculation.

A case in which TEPs are included in the virtual switch 31 in the communication apparatus 30 has been described. However, when the communication apparatus 30 includes a physical switch, the TEPs may be included in the physical switch. In this case, a physical communication apparatus coupled to the physical switch may transmit and receive a detection packet in the same way as the virtual machine 10, instead of the virtual machine 10.

As a result of the calculation on the hash value in the inner header and the value of the variable that takes a different value for each detection packet, the same value as the hash value in the inner header may be obtained. However, even if the calculation result for one detection packet matches the hash value in the inner header, a different variable is used in calculation for each detection packet. In another detection packet, therefore, a value different from the hash value in the inner header is highly likely to be obtained as a calculation result.

The number of reproductions of a detection packet may be determined according to the number of paths used in communications between communication apparatuses 30, between which a detection packet is transmitted and received. For example, the reproduction count determining unit 52 may determine the number of paths through which a detection packet is able to pass, according to the destination of the detection packet, after which the reproduction count determining unit 52 may determine the number of reproductions at which the probability of being capable of determining whether there is a fault occurring for all of the paths is a predetermined value or greater. The number of paths may be determined through communication between communication apparatuses 30 and switches 20. Alternatively, the reproduction count determining unit 52 may obtain the number of paths from an apparatus, such as the management apparatus 80, that stores information about paths on the network.

Although a case in which VXLAN is used in encapsulation has been described as an example, the system described above is applicable to any communication system that involves encapsulation. For example, processing described above is also applicable to a system that uses MAC-in-MAC and a system that uses both IPv4 and IPv6.

Processing in the TEP may be changed according to the implementation. For example, the header information recording unit 61 may acquire information in the outer header from the outer header adding unit 43, instead of acquiring the source port number from the hash calculating unit 42.

In the second embodiment, an example has been described in which the predicted number of receptions of reply packets is obtained from the number of reproductions of a detection packet and, to determine whether as many reply packets as the initial value of the predicted number of receptions have been received, the predicted number of receptions, which is stored in the storage unit 51, is decremented by one each time a reply packet is received. However, the method described with reference to, for example, FIG. 13 is just an example. Any method may be used by which it is possible to determine whether as many reply packets as the initial value of the predicted number of receptions have been received, according to the implementation. For example, the counting unit 54 may operate so that the counting unit 54 stores the initial value of the predicted number of receptions, increments the number of receptions of reply packets, and, when the number of receptions of reply packets becomes equal to the initial value of the predicted number of receptions, outputs a reply to the virtual machine 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
   calculating, from information included in a packet received, a first value that is used to select a communication path through which the received packet is to be transmitted to a destination apparatus;
   in response to detecting that the received packet is a detection packet used to detect a fault in a communication path to the destination apparatus,
      obtaining a second value by performing a calculation on the first value and a variable value that is changed each time a detection packet is detected to be transmitted, and adding an outer header including the second value to the packet, and
      transmitting the detection packet to which the outer header including the second value has been added, to the destination apparatus; and
   in response to detecting that the received packet is not a detection packet,
      adding an outer header including the first value to the received packet, and
      transmitting the received packet to which the outer header including the first value has been added, to the destination apparatus.

2. The non-transitory, computer-readable recording medium of claim 1, wherein in response to the detecting that the received packet is the detection packet,
   reproducing a plurality of detection packets according to a reproductions count, a reproduced detection packet including a corresponding second value to be included, as the second value, in an outer header to be added to the reproduced detection packet, the corresponding second value obtained by performing a calculation on the first value and a corresponding variable value selected as the variable value.

3. The non-transitory, computer-readable recording medium of claim 2, the process further comprising:
   calculating a predicted number of receptions of reply packets responsive to the plurality of reproduced detection packets by using the reproductions count;
   suspending output of a reply packet to a source apparatus from which the detection packet was received until a number of receptions of reply packets reaches the predicted number of receptions of reply packets; and
   when the number of receptions of reply packets is equal to the predicted number of receptions of reply packets, outputting one of the reply packets to the source from which the detection packet was received.

4. The non-transitory, computer-readable recording medium of claim 2, the process further comprising:
   determining the reproductions count by using a total number of paths from a transmission source of the detection packet to the destination apparatus and a probability that at least one of reproduced detection packets passes through each of the total number of paths.

5. The non-transitory, computer-readable recording medium of claim 2, the process further comprising:
   calculating the first value as a source port number in the outer header to be added to the detection packet;
   setting a source port number in the outer header to be added to the reproduced detection packet to the corresponding second calculation value.

6. An apparatus comprising:
   a processor configured to:
      calculate, from information included in a packet received, a first value that is used to select a communication path through which the received packet is to be transmitted to a destination apparatus;
      in response to detecting that the received packet is a detection packet used to detect a fault in a communication path to the destination apparatus,
         obtain a second value by performing a calculation on the first value and a variable value that is changed each time a detection packet is detected to be transmitted, and add an outer header including the second value to the packet, and
         transmit the detection packet to which the outer header including the second value has been added, to the destination apparatus; and
      in response to the detecting that the received packet is not a detection packet,
         add an outer header including the first value to the received packet, and
         transmit the received packet to which the outer header including the first value has been added, to the destination apparatus; and
   a memory coupled to the processor and configured to store information used for determining whether the received packet is a detection packet.

7. The apparatus of claim 6, wherein the processor is further configured to:
   in response to the detecting that the received packet is the detection packet, reproducing a plurality of detection packets according to a reproductions count, a reproduced detection packet including a corresponding second value to be included, as the second value, in an outer header to be added to the reproduced detection packet, the corresponding second value obtained by performing a calculation on the first value and a corresponding variable value selected as the variable value.

8. The apparatus of claim 7, wherein the processor is further configured to:
   calculate a predicted number of receptions of reply packets responsive to the plurality of reproduced detection packets by using the reproductions count, suspend output of a reply packet to a source apparatus from which the detection packet was received until a number of receptions of reply packets reaches the predicted number of receptions of reply packets, and when the number of receptions of reply packets is equal to the predicted number of receptions of reply packets, outputting one of the reply packets to the source from which the detection packet was received.

9. The apparatus of claim 7, wherein the processor is further configured to:

determine the reproductions count by using a total number of paths from a transmission source of the detection packet to the destination apparatus and a probability that at least one of reproduced detection packets passes through each of the total number of paths.

10. The apparatus of claim 7, wherein the processor is further configured to:

calculate the first value as a source port number in the outer header to be added to the detection packet;

set a source port number in the outer header to be added to the reproduced detection packet, to the corresponding second calculation value.

11. A method comprising:

causing an information processing apparatus to:
calculate, from information included in a packet received, a first value that is used to select a communication path through which the received packet is to be transmitted to a destination apparatus;

in response to detecting that the received packet is a detection packet used to detect a fault in a communication path to the destination apparatus,
obtain a second value by performing a calculation on the first value and a variable value that is changed each time a detection packet is detected to be transmitted, and add an outer header including the second value to the packet, and transmit the detection packet to which the outer header including the second value has been added, to the destination apparatus;

in response to the detecting that the received packet is not a detection packet, add an outer header including the first value to the received packet, and transmit the received packet to which the outer header including the first value has been added, to the destination apparatus; and detect a fault by determining whether a reply packet to the detection packet is obtained.

12. The method of claim 11, further comprising:

causing a management apparatus operable to communicate with apparatuses including the information processing apparatus in a network, to:

determine candidate communication paths from the information processing apparatus to the destination apparatus, obtain a passing state based upon notified passing information of a packet reproduced by adding the outer header to the detection packet, from the information processing apparatus, the destination apparatus, and a forwarding apparatus that forwards the reproduced packet transmitted and received between the information processing apparatus and the destination apparatus, and detect an occurrence of the fault for a candidate communication path among the candidate communication paths by determining, from the passing state obtained from at least the forwarding apparatus disposed on the candidate communication path, whether the reproduced packet arrived at the destination apparatus through the candidate communication path.

13. The method of claim 12, wherein the passing information of which the management apparatus is notified as the passing state includes a value that has been set in the outer header in the detection packet as the second value; and when a first calculation value obtained by performing a calculation on the first value and the variable value is set as the second value in an outer header of a first detection packet, and when a second calculation value obtained from a calculation on the first value and a second variable value is set as the second value in an outer header of a second detection packet, the management apparatus,
determines that the first detection packet has passed through candidate communication path among the candidate communication paths on which at least a forwarding apparatus disposed on the candidate communication path and that has notified the management apparatus of the passing information including the first calculation value, and determines that the second detection packet has passed through another candidate communication path among the candidate communication paths on which another forwarding apparatus disposed on the another candidate communication path and that has notified the management apparatus of the passing information including the second calculation value is disposed.

* * * * *